(12) United States Patent
Liu

(10) Patent No.: US 8,041,557 B2
(45) Date of Patent: Oct. 18, 2011

(54) WORD TRANSLATION DEVICE, TRANSLATION METHOD, AND COMPUTER READABLE MEDIUM

(75) Inventor: Shaoming Liu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 918 days.

(21) Appl. No.: 11/817,008

(22) PCT Filed: Feb. 22, 2006

(86) PCT No.: PCT/JP2006/303155
§ 371 (c)(1),
(2), (4) Date: Aug. 23, 2007

(87) PCT Pub. No.: WO2006/090732
PCT Pub. Date: Aug. 31, 2006

(65) Prior Publication Data
US 2009/0106018 A1 Apr. 23, 2009

(30) Foreign Application Priority Data
Feb. 24, 2005 (JP) .................................. 2005-048595

(51) Int. Cl.
*G06F 17/28* (2006.01)
(52) U.S. Cl. .............. 704/7; 704/2; 704/3; 704/4; 704/5
(58) Field of Classification Search .................. 704/2, 4, 704/9, 10
See application file for complete search history.

(56) References Cited

U.S. PATENT DOCUMENTS

| | | | |
|---|---|---|---|
| 5,029,084 A | * | 7/1991 | Morohasi et al. .................. 704/9 |
| 5,229,936 A | * | 7/1993 | Decker et al. .................... 704/10 |
| 5,301,109 A | * | 4/1994 | Landauer et al. ................. 704/9 |
| 5,615,378 A | * | 3/1997 | Nishino et al. .................... 704/4 |

(Continued)

FOREIGN PATENT DOCUMENTS

CN 1078565 A 11/1993

(Continued)

OTHER PUBLICATIONS

Davis et al, "Query Translation Using Evolutionary Programming for Multi-Lingual Information Retrieval", Mar. 1995, in Proc. of trh efourth Annual Conf. on Evolutionary Programming, pp. 1-11.*

(Continued)

*Primary Examiner* — Richemond Dorvil
*Assistant Examiner* — Olujimi Adesanya
(74) *Attorney, Agent, or Firm* — Sughrue Mion, PLLC

(57) ABSTRACT

A word translation device stores a first-language word search TRIE structure (100), a second-language word search TRIE structure (200), a first-language word information record (110), a second-language word information record (210) in a bilingual dictionary. The first-language word search TRIE structure (100) is provided for searching for words of the first language. The second-language word search TRIE structure (200) is provided for searching for words of the second language. The first-language word information record (110) includes first translation information for identifying a translation of each of the words stored in the first-language word search TRIE structure (100). The second-language word information record (210) includes second translation information for identifying a translation of each of the words stored in the second-language word search TRIE structure (200). By referring to the first and second word information records (110) and (210), word translation between the first and second languages can be performed with high precision at high speeds.

10 Claims, 27 Drawing Sheets

U.S. PATENT DOCUMENTS

| | | | |
|---|---|---|---|
| 5,721,899 A * | 2/1998 | Namba | 1/1 |
| 6,393,389 B1 * | 5/2002 | Chanod et al. | 704/7 |
| 6,904,402 B1 * | 6/2005 | Wang et al. | 704/10 |
| 6,910,043 B2 * | 6/2005 | Iivonen et al. | 1/1 |
| 7,707,026 B2 * | 4/2010 | Liu | 704/7 |
| 2002/0123982 A1 * | 9/2002 | Masuichi | 707/1 |
| 2003/0204400 A1 * | 10/2003 | Marcu et al. | 704/251 |
| 2005/0015240 A1 * | 1/2005 | Appleby | 704/9 |
| 2006/0004744 A1 * | 1/2006 | Nevidomski et al. | 707/4 |
| 2006/0293880 A1 * | 12/2006 | Elshishiny et al. | 704/10 |

FOREIGN PATENT DOCUMENTS

| | | |
|---|---|---|
| JP | 1-291363 A | 11/1989 |
| JP | 3-051959 A | 3/1991 |
| JP | 5-108621 A | 4/1993 |
| JP | 5266069 A | 10/1993 |
| JP | 2000-276479 A | 10/2000 |

OTHER PUBLICATIONS

Masuichi et al, "Query Translation Method for Cross Language Information Retrieval", 1999, In the Proc. Of Machine Translation Summit VII, pp. 1-5.*

Kadoya et al, "A Compressed Algorithm Usng Integrated Record Information for Translation Dictionaries", Oct. 2004, Information Sciences, vol. 165, Issues 3-4, pp. 171-186.*

Hoque et al, "Multilingual Data Management System", Dec. 2005, In Proc. of the International Conference of Computer and Information Technology, IUT , pp. 1-5.*

Y. Kadoya et al., A compression algorithm using integrated record information for translation dictionaries (Abstract), Nov. 4, 2003 (online availability date, retrieved Oct. 21, 2010), pp. 1-2, www.sciencedirect.com.

* cited by examiner

STRUCTURE OF WORD INFORMATION RECORD

FIG. 7

| WORD FLAG | MEANING | |
|---|---|---|
| 0 | INTERMEDIATE NODE | |
| 1 | WORD NODE : | INFORMATION ON THE PATH FROM THE ROOT TO THE NODE REPRESENTS THE WORD |
| 2 | PRONUNCIATION NODE : | INFORMATION ON THE PATH FROM THE ROOT TO THE NODE REPRESENTS THE PRONUNCIATION |
| 3 | WORD AND PRONUNCIATION NODE : | INFORMATION ON THE PATH FROM THE ROOT TO THE NODE REPRESENTS THE WORD AND PRONUNCIATION |

FIG. 8A

| CHILD FLAG | MEANING |
|---|---|
| 0 | NO LOWER NODES EXIST |
| 1 | AT LEAST ONE LOWER NODE EXISTS |

FIG. 8B

| LANGUAGE ID | NAME OF LANGUAGE |
|---|---|
| 1 | Japanese |
| 2 | Chinese |
| 3 | English |

FIG. 9

| WORD INFORMATION RECORD ID | | | | | | | | | |
|---|---|---|---|---|---|---|---|---|---|
| WORD ID | PRONUN-CIATION ID | PART OF SPEECH ID | PRIORITY LEVEL | SYNONYMITY INFORMATION | CONCEPT ID | LEFT LINKAGE INFORMATION ID | RIGHT LINKAGE INFORMATION ID | TRANS-LATION LANGUAGE ID | TRANS-LATION ID | NEXT SYNONYMOUS WORD INFORMATION RECORD ID | REMARKS |

STRUCTURE OF CHARACTER INFORMATION IN TRIE STRUCTURES
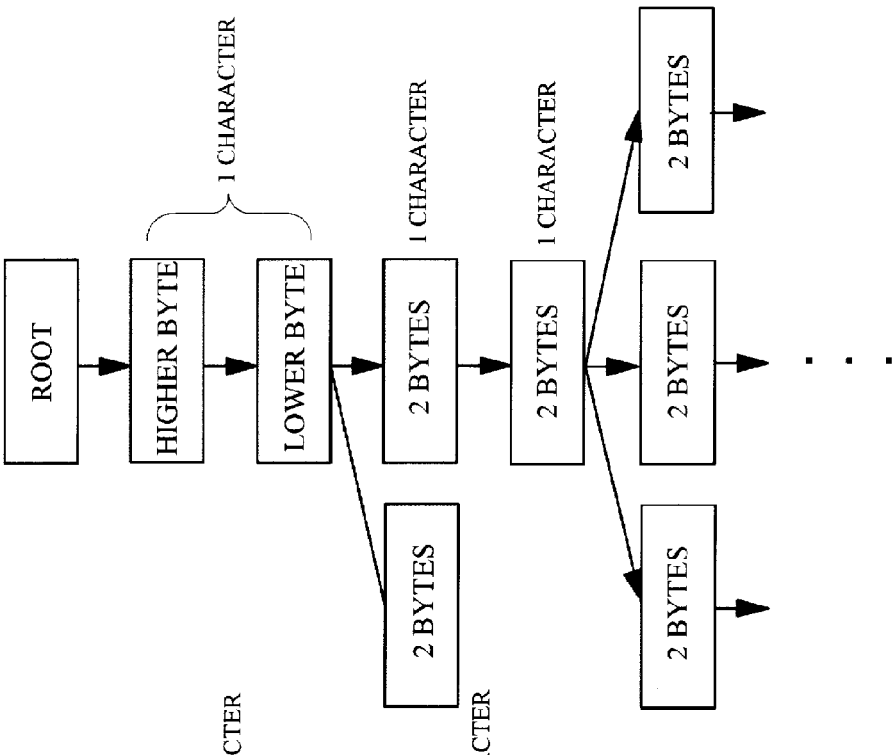
FIG. 10C
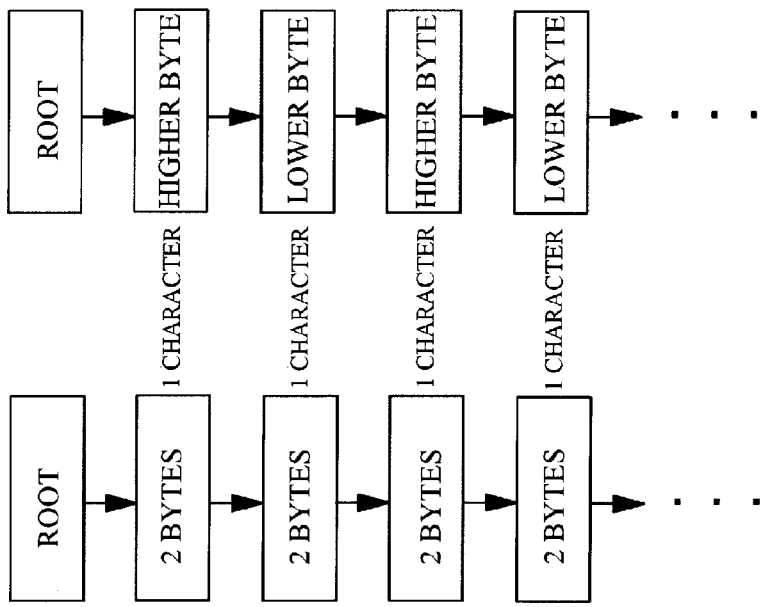
FIG. 10B
FIG. 10A FIG. 13  WORD INFORMATION RECORD STORAGE
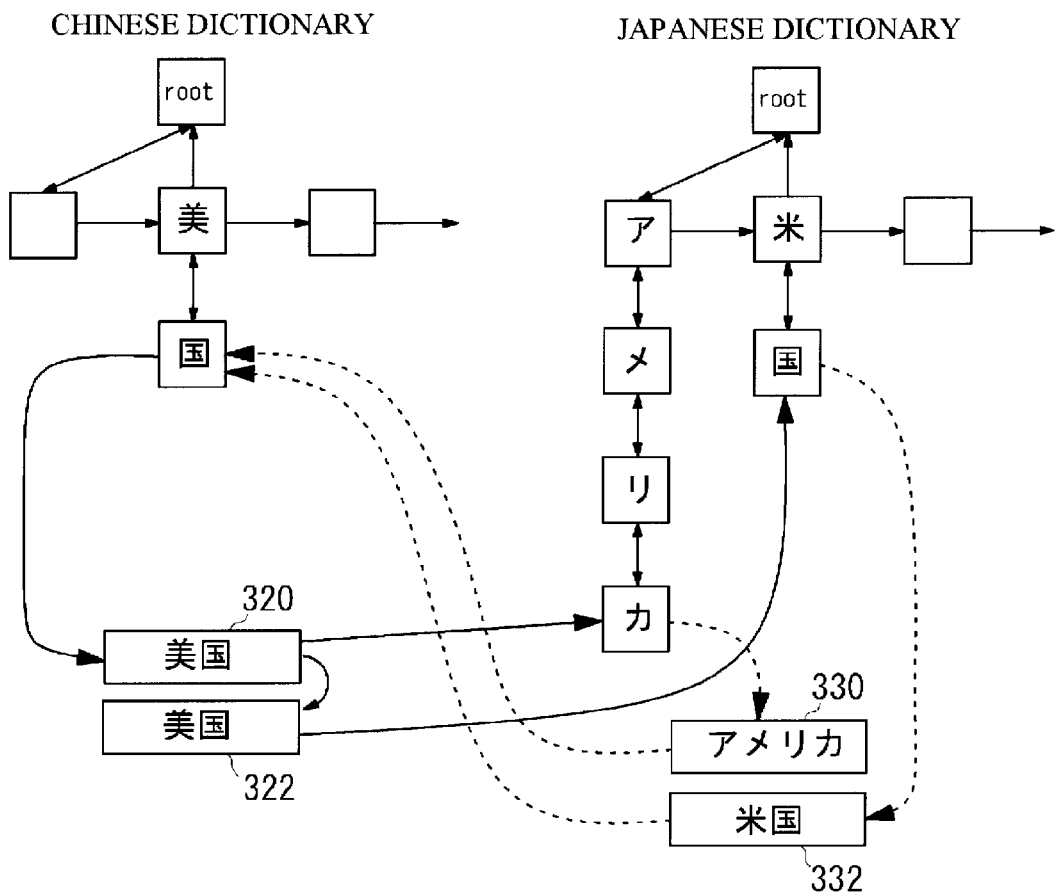
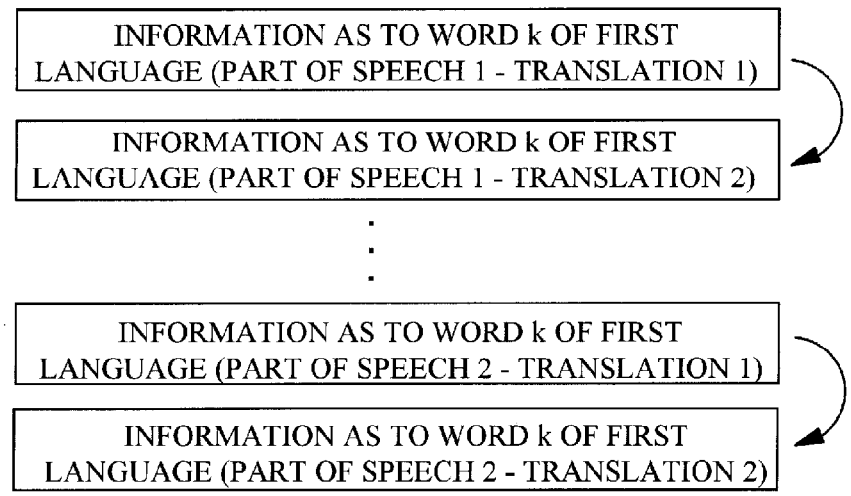

FIG. 14          WORD INFORMATION RECORD STORAGE
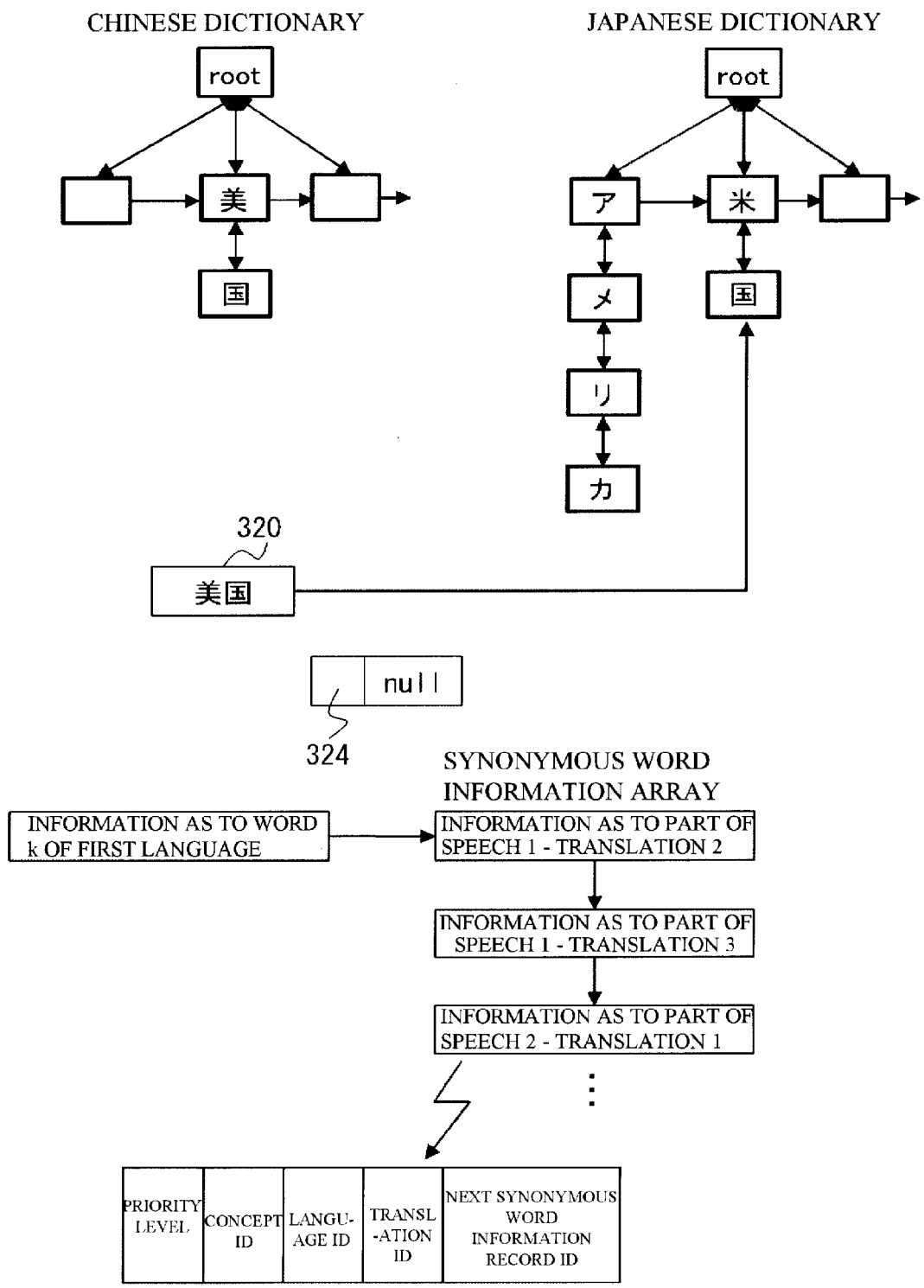

FIG. 21A

WORD INFORMATION RECORD

| WORD ID | PRONUN-CIATION ID | PART OF SPEECH ID | PRIORITY LEVEL | SYNONY-MITY INFORMATION | WORD/CHUNK IDENTI-FICATION FLAG | AREA CLASSIFI-CATION ID | CONCE-PT ID | LEFT LINKAGE INFORMA-TION ID | RIGHT LINKAGE INFORMA-TION ID | TRANSL-ATION LANGUA-GE ID | TRANSLATI-ON INFORMATI-ON RECORD ID | NEXT SYNONYMOUS WORD INFORMATION RECORD ID | REMA-RKS |
|---|---|---|---|---|---|---|---|---|---|---|---|---|---|

FIG. 21B

| LANGUAGE ID | NAME OF LANGUAGE |
|---|---|
| 1 | Japanese |
| 2 | Chinese |
| 3 | English |

FIG. 21C

| CHILD FLAG | MEANING |
|---|---|
| 1 | NO LOWER NODES EXIST |
| 2 | AT LEAST ONE LOWER NODE EXISTS |

FIG. 22

| WORD INFORMATION RECORD | WORD ID | PRONUN- CIATION ID | PART OF SPEECH ID | PRIORITY LEVEL | SYNONYMITY INFORMA- TION | WORD/ CHUNK IDENTI- FICATION FLAG | AREA CLASSIFI- CATION ID | CONCEPT ID | LEFT LINKAGE INFORMA- TION ID | RIGHT LINKAGE INFORMA- TION ID | SYNONYMOUS WORD INFORMATION RECORD ID | REMARKS |

FIG. 23

| SYNONYMOUS WORD INFORMATION | TRANS-LATION LANGUAGE ID | WORD INFORMATION RECORD ID OF PARENT WORD | SYNONYMOUS WORD INFORMATION RECORD ID OF TRANSLATION WORD | SYNONYMOUS WORD INFORMATION RECORD ID OF NEXT SYNONYMOUS WORD |
|---|---|---|---|---|

WORD TRANSLATION DEVICE, TRANSLATION METHOD, AND COMPUTER READABLE MEDIUM

TECHNICAL FIELD

The present invention generally relates to a word translation device that translates each word of a source language into a word of an object language, and more particularly, to a technique of translation between two or more languages.

BACKGROUND ART

By a word translation technique, an input word of a first language is referred to a bilingual dictionary, and a translation of the word in a second language is extracted from the bilingual dictionary. The extracted translation is then output. By a sentence translation technique, an input sentence in a first language is analyzed in terms of morpheme, and the group of the words constituting the sentence is extracted. Translations of the extracted words are retrieved from a bilingual dictionary, and a translation in the form of a sentence is formed on the basis of the links between the words. For example, Non-Patent Reference 1 discloses a machine translation system that utilizes the links between words.

Such word and sentence translation techniques are utilized in electronic word translation devices and computers. In an electronic word translation device, bilingual dictionaries of two or more languages are stored in a memory. When a user inputs a word of a first language, a translation of the word is extracted from one of the bilingual dictionaries, and is displayed on a display.

Patent Reference 1 discloses a technique for saving each user the trouble of selecting the type of dictionary when a search is carried out in an electronic dictionary device. Based on a search word that is input by a user, dictionaries are searched for a direction word, and the contents of dictionaries containing the direction word are collectively displayed.

[Patent Reference 1]
Japanese Unexamined Patent Publication No. 2000-276479
[Non-Patent Reference 1]
Suzuki and Tochinai, "Machine Translation System Using Conjunctive Relations of Words", IPSJ Transactions, Vol. 29, No. 4, 1988

DISCLOSURE OF THE INVENTION

Problems to be Solved by the Invention

Each of the bilingual dictionaries is normally designed to involve one language to be translated into another (such as Japanese into English or English into Japanese), and word information is recorded doubly in the bilingual dictionaries. Word information used when translation from Japanese into English is performed is not shared when translation from English into Japanese is performed, for example. As a result, the production costs of the dictionaries become high. Also, since the bilingual dictionaries cannot be referred to each other, there is the problem of information missing from the bilingual dictionaries. For example, a pair of words having the same meanings in the Japanese-English dictionary might not exist in the English-Japanese dictionary. In the electronic device disclosed in Patent Reference 1, the English-Japanese translation dictionary and the Japanese-English translation dictionary are used independently of each other, and the above problem is not solved.

The ultimate goal of sentence translation is to obtain an accurate translated sentence. In reality, however, accurate translations cannot be easily obtained. In a translation document, some sentences are accurate but some sentences are inaccurate, and it is difficult for a user to determine which sentences are accurate. Non-Patent Document 1 does not disclose or suggest any structure to solve this problem either.

It is therefore an object of the present invention to provide a word translation device, a translation method, and a translation program that involve a bilingual or multilingual dictionary for enabling translation between two languages or among more than two languages.

Means for Solving the Problems

The present invention provides a word translation device that performs word translation between languages, and the word translation device includes a storage unit that stores at least a first word search structure, a second word search structure, a first word and translation information record, and a second word and translation information record in a dictionary, the first word search structure being provided for searching for a word of a first language, the second word search structure being provided for searching for a word of a second language, the first word and translation information record including word-associated information and translation information as to words stored in the first word search structure, the second word and translation information record including word-associated information and translation information as to words stored in the second word search structure. When a word of a given language is translated into a word in another language, the word is referred to the word search structure of the source language. If there is the corresponding word in the word search structure of the source language, the corresponding word information and the translation information are obtained from the word and translation information record. Based on the obtained translation information, the corresponding translation information is obtained from the word search structure of the other language. If there is not the corresponding word in the word search structure of the source language, the word of the source language is output as it is.

In the word translation device of the present invention, the first and second word search structures include word and translation information record identification information for identifying word and translation information records.

In the word translation device of the present invention, the first and second word and translation information records include word identification information for identifying the words stored in the first and second word search structures, respectively.

In the word translation device of the present invention, the first and second word and translation information records include associated information as to the words stored in the first and second word search structures, respectively.

In the word translation device of the present invention, the first word and translation information record includes translation identification information for identifying the translation information stored in the second word and translation information record, and the second word and translation information record includes translation identification information for identifying the translation information stored in the first word and translation information record.

In the word translation device of the present invention, the first and second word and translation information records include identification information for identifying synonyms for each translation.

In the word translation device of the present invention, the first and second word and translation information records include identification information for identifying the kind of a language in which a translation is made.

In the word translation device of the present invention, the first and second word and translation information records include records that store one piece of word-associated information and one piece of translation information as to each part of speech (POS), if the subject word has more than one part of speech.

In the word translation device of the present invention, the record of each part of speech is associated with the one piece of word-associated information by a pointer.

More preferably, the word translation device further includes: an input unit that inputs a word; a referring unit that refers the input word to the words stored in the first word search structure; an extracting unit that extracts a translation from the translations stored in the second word search structure, based on the first word and translation information record associated with the word; and an output unit that outputs the extracted translation. With this structure, each input word can be translated at a high speed with high precision. More preferably, the extracting unit extracts the second word and translation information, based on the first word and translation information record associated with the word referred by the referring unit. Alternatively, the translation information of the first word and translation information record may include link information for identifying a translation stored in the second word search structure or a second word and translation information record, and the extracting unit may extract the translation or the second word and translation information record, based on the link information.

Another word translation device of the present invention that perform word translation between two or more languages includes a storage unit that stores, in a dictionary, word search TRIE structures of N languages (N being an integer of 2 or larger), and word information records of the N languages that are associated with the respective word search TRIE structures of the N languages. The word information record of one language among the word information records of the N languages includes translation information for identifying translations of the one language in the two or more languages. With this structure, the word translation device of the present invention can perform word translation not only between two languages but also among three or more languages (multilingual translation).

A machine translation system of the present invention includes: a translating unit that inputs a sentence and translates the sentence; and the above word translation device, which inputs a word that is not translated by the translating unit, and translates the word. In the machine translation system, the translating unit includes at least one of a translation memory engine, a pattern-based translation engine, and a chunk-based example translation engine. More preferably, the machine translation system further includes a distinction output unit that distinguishes a translation of the word that is not translated by the translating unit from other translations, and outputs the translation. With this structure, highly accurate translation can be performed, and users can easily determine which translation has high credibility and which translation has low credibility.

Yet another word translation device of the present invention that performs word translation between two ore more languages includes a storage unit that stores word search dictionary data provided for each of the languages, and link information that is provided for each word stored in the word search dictionary data provided for each of the languages and indicates relationship between a word in one language and a translation of the word in another language.

With this structure, words of one language are linked with words of another language by the link information. Accordingly, translation between two languages or among more than two languages can be performed.

More preferably, in the word translation device, the link information includes identification information for identifying the word of the one language, identification information for identifying the other language, a pointer that points at the link information as to the translation in the other language, and a pointer that points at the link information as to a synonym for the word of the one language.

More preferably, in the word translation device, the link information includes parent link information and child link information. The parent link information includes a pointer that points at the child link information as to the synonym for the word of the one language. The child link information includes the identification information for identifying the other language, a pointer that points at the corresponding parent link information, a pointer that points at the child link information as to the translation in the other language, and a pointer that points at the child link information as to another synonym.

More preferably, in the word translation device, the link information is provided for each part of speech, if the word has more than one part of speech. The word search dictionary data includes a word search structure that is provided for each of the languages and is to be used for searching for words, and a word information record that is provided for each of the languages and stores information as to the words.

More preferably, the word information record includes the link information. The word search structure may include a word TRIE structure or a hash function structure, for example.

More preferably, in the word translation device, the word search dictionary data includes list information as to the first character of each word of a corresponding language, and list information as to the word. The first character list information includes information as to the first character, the number of words starting with the first character, a pointer that points at a location in the list information as to the words starting with the first character. The word list information includes a pointer that points at the link information as to the word.

More preferably, the link information is associated with the word information record including the information as to the words stored in the word search dictionary data.

More preferably, the word translation device further includes: an input unit that inputs a word of the one language; a referring unit that refers the input word of the one language to the word search dictionary data as to the one language; and an extracting unit that extracts a translation in the other language from the word search dictionary data as to the other language, based on the link information as to the referred word of the one language. With this structure, word translation can be performed with high precision. More preferably, the extracting unit extracts a word information record of the other language, based on the link information as to the word information record of the one language referred by the referring unit. Also, the extracting unit may extract the translation from the word search structure of the other language, based on the link information as to the word information record of the one language referred by the referring unit.

A word translation method of the present invention for translating words between two or more languages includes the step of storing a first word search structure, a second word search structure, a first word information record, and a second word information record in a dictionary. The first word search structure is provided for searching for a word of a first language, the second word search structure is provided for searching for a word of a second language, the first word information record includes first translation information for identifying translations of words stored in the first word search structure, and the second word information record includes second translation information for identifying translations of words stored in the second word search structure.

The word translation method further includes the steps of: inputting a word; referring the input word to the words stored in the first word search structure; extracting a translation from the second word search structure, based on the first word information record of the referred word; and outputting the extracted translation. More preferably, the word search dictionary data includes a word information record that is provided for each of the languages and stores a word search structure and information as to words. The word information record includes the link information. In the extracting step, the word information record of the other language is extracted based on the link information of the word information record of the one language.

A translation method of the present invention for translating words between two or more languages includes the step of storing word search dictionary data and link information in a storage unit. The word search dictionary data is provided for each of the languages, and the link information is provided for each word stored in the word search dictionary data provided for each of the languages and indicates the relationship between a word of one language and a translation of the word in another language.

More preferably, the translation method further includes the steps of: inputting a word of one language; referring the input word of the one language to the word search dictionary data provided for the one language; and extracting a translation in another language from the word search dictionary data provided for the other language, based on the link information as to the referred word of the one language.

A word translation program of the present invention for translating words between two or more languages is to be executed to carry out the step of storing a first word search structure, a second word search structure, a first word information record, and a second word information record in a dictionary. The first word search structure is provided for searching for a word of a first language, the second word search structure is provided for searching for a word of a second language, the first word information record includes first translation information for identifying translations of words stored in the first word search structure, and the second word information record includes second translation information for identifying translations of words stored in the second word search structure.

Another word translation program of the present invention for translating words between two or more languages is to be executed to carry out the step of storing word search dictionary data and link information in a storage unit. The word search dictionary data is provided for each of the languages, and the link information is provided for each word stored in the word search dictionary data provided for each of the languages and indicates the relationship between a word of one language and a translation of the word in another language.

More specifically, a translation program is to be executed to carry out the steps of: inputting a word of one language; referring the input word of the one language to the word search dictionary data provided for the one language; and extracting a translation in another language from the word search dictionary data provided for the other language, based on the link information as to the referred word of the one language.

Effects of the Invention

In accordance with the present invention, word search dictionary data and link information are provided for each language. Accordingly, translation between languages can be performed with high precision at a high speed. Further, a word translation device of the present invention can be applied not only to bilingual word translation but also to multilingual word translation.

BRIEF DESCRIPTION OF THE DRAWINGS

FIG. 7 shows explanation of word flags;

FIG. 8A shows explanation of child flags;

FIG. 8B shows explanation of language IDs;

FIG. 9 shows the structure of a word information record ID;

FIGS. 10A through 10C show the structure of the character information in TRIE structures;

FIG. 13 illustrates a first example of the method for storing word information records;

FIG. 14 illustrates a second example of the method for storing word information records;

FIGS. 21A through 21C show the structure of a word information record where an array structure base is employed;

FIG. 22 shows the structure of a word information record where a double-array structure base is employed;

FIG. 23 shows the structure of a synonymous word information record where a double-array structure base is employed;

BEST MODES FOR CARRYING OUT THE INVENTION

Figure 1:
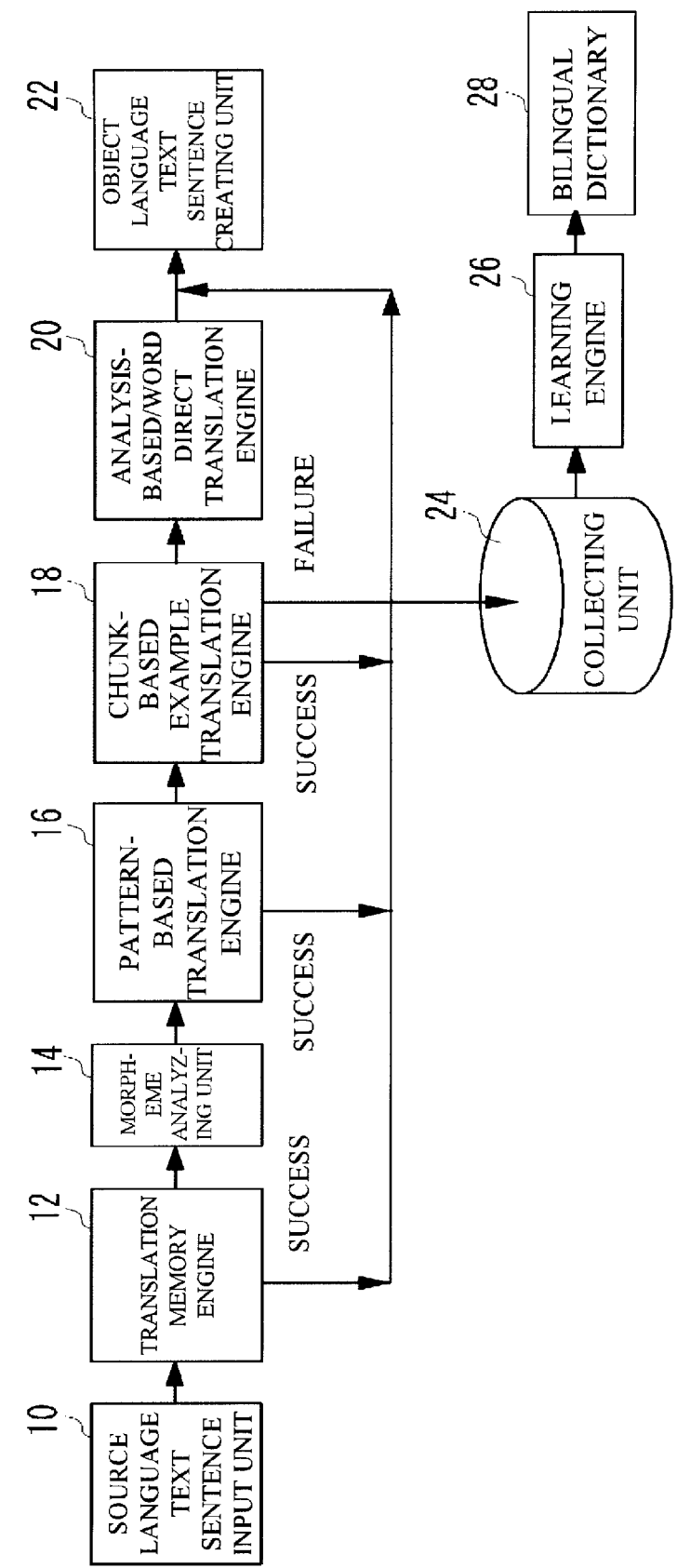
FIG. 1 illustrates the structure of a machine translation system in accordance with an exemplary embodiment of the present invention.

The following is a description of preferred exemplary embodiments of the present invention, with reference to the accompanying drawings. FIG. 1 illustrates the entire structure of a machine translation system in accordance with an exemplary embodiment of the present invention. The machine translation system 1 can translate not all the components of a document. If an untranslatable component is translated by constraint, the result baffles the user, and adversely affects the understanding of the content of the source sentence. Therefore, translation results are classified into successes and failures, and credibility levels are allotted to the translation results. Also, the translation system is equipped with a learning function to automatically collect untranslatable components and attach accurate translations to the untranslatable components. In this manner, the translation performance is enhanced.

The machine translation system 1 includes: a translation memory engine 12 that translates each sentence that is input through a source language text sentence input unit 10; a morpheme analyzing unit 14 that receives a component not contained in the database in the translation memory engine 12 or a component not translated accurately, and analyzes the morpheme of the component; a pattern-based translation engine 16 that receives the sentence or the word analyzed by the morpheme analyzing unit 14, and translates the sentence or the word on the basis of a pattern; a chunk-based example translation engine 18 that translates the component not translated by the pattern base translation engine 16 on the basis of a chunk-based example sentence (a combination or words or a phrase such as a noun phrase); an analysis-based/word direct translation engine 20 that receives a word not translated by the chunk-based example translation engine 18, and translates the word on the basis of analysis or word by word; and an object language text sentence creating unit 22 that creates an object language text sentence. The chunk-based example translation engine 18 holds a translation extraction function. The translation extraction function associates each word string contained in a sentence with a word string translated from the word string. The analysis-based/word direct translation engine 20 applies the translation extraction function to each word string extracted from the sentence, and obtains a translation of the word string.

The translation data as to the components successfully translated by the translation memory engine 12, the pattern-based translation engine 16, and the chunk-based example translation engine 18 are input to the object language text sentence creating unit 22. Based on the translation data, the object language text sentence creating unit 22 creates a text sentence in the object language. Here, identifications guaranteeing accuracy are allotted to the successfully translated components. The translation data obtained through the analysis-based/word direct translation engine 20 is output only as guide translations from the object language text sentence creating unit 22. Accordingly, a user can promptly distinguish credible translation results from unreliable translation results in the text translation. Meanwhile, the components that cannot be translated by the chunk-based example translation engine 18 are collected by a collecting unit 24. Each of the collected untranslatable components is then accurately translated by a human translator, and the result is input to a learning engine 26. Based on the accurate translation, the learning engine 26 writes bilingual data in a bilingual dictionary 28.

Figure 2:
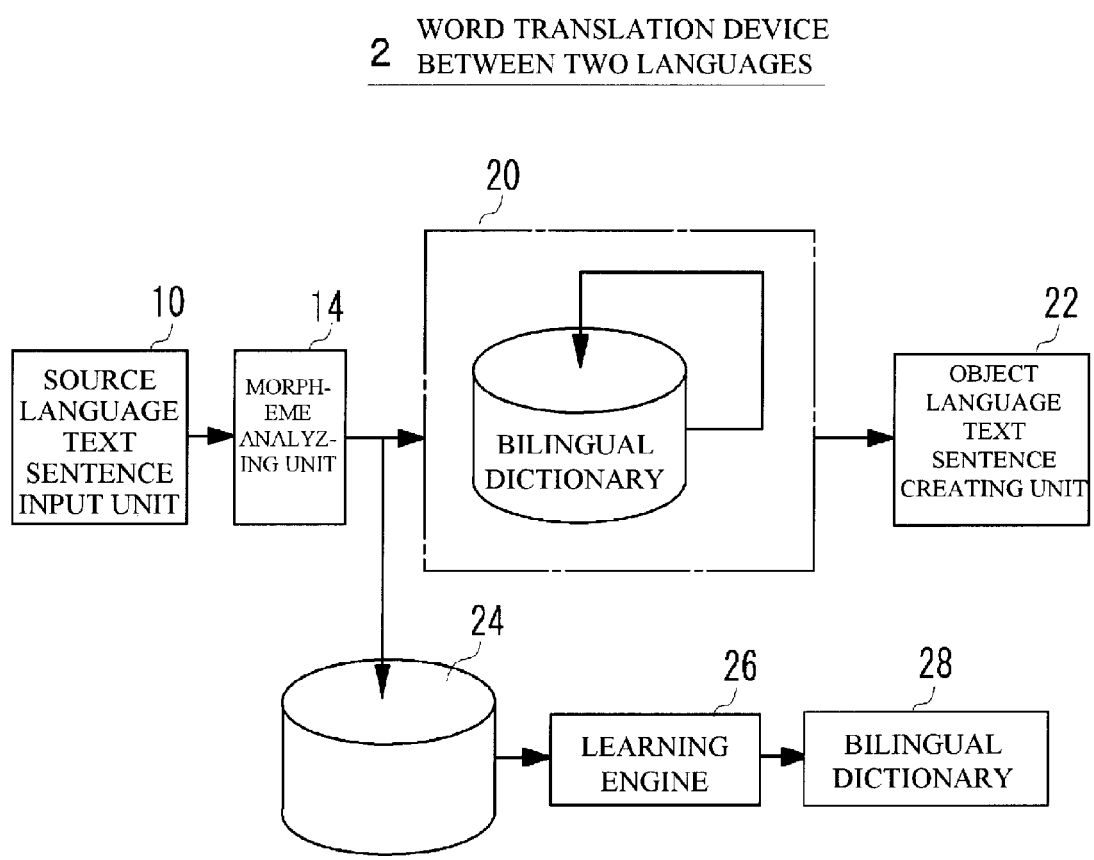
FIG. 2 illustrates the structure of a word translation device between two languages.

FIG. 2 illustrates the structure of a word translation device between two languages as a preferred version of this exemplary embodiment. The function of translating words between two languages is provided in the word direct translation engine 20. In the word translation device, the source language text input unit 10 inputs each text or word into the morpheme analyzing unit 14. Here, an attribute (such as a "noun" or a "verb") is attached to each word, and the word is then input to the word direct translation engine 20. Using a bilingual dictionary, the word direct translation engine 20 translates each input word of the source language into a word of the object language, and outputs the result to the object language text sentence creating unit 22. The bilingual dictionary used by the word direct translation engine 20 may be the bilingual dictionary 28 learned by the learning engine 26.

Figure 3:
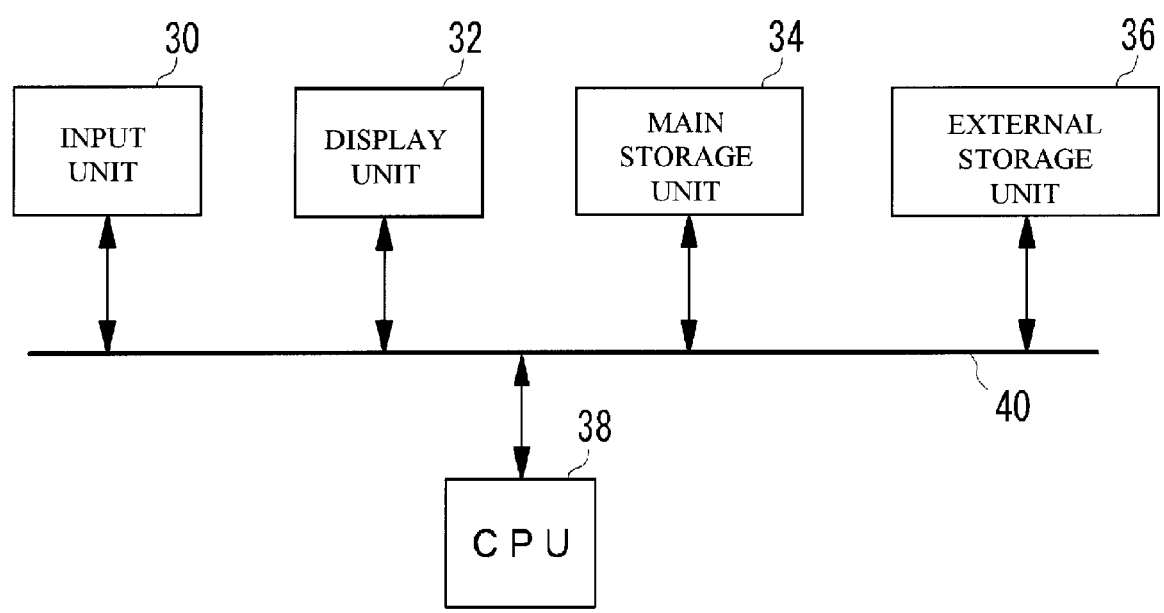
FIG. 3 illustrates the hardware structure of a word direct translation engine in accordance with the exemplary embodiment of the present invention.

FIG. 3 illustrates the hardware structure of the word translation device between two languages. The word translation device includes an input unit 30, a display unit 32, a main storage unit 34, an external storage unit 36, a central processing unit 38, and a bus 40 that connects those units. The input unit 30 may be a keyboard through which each word is input by a key operation, an optical reader that optically reads each word contained in a document, or a result of an operation performed by some other hardware or software such as an output of a chunk-based example translation engine.

The display unit 32 includes a display or the like that outputs each word of the object language translated from the source language. The main storage unit 34 includes a ROM or a RAM, and stores a program for controlling word translations and data such as operation results. The external storage unit 36 includes a mass-storage device such as a hard disk. The bilingual dictionary necessary for translating words is stored in the mass-storage device. The CPU (central processing unit) 38 controls each unit in accordance with the program stored in the main storage unit 34.

Figure 4:
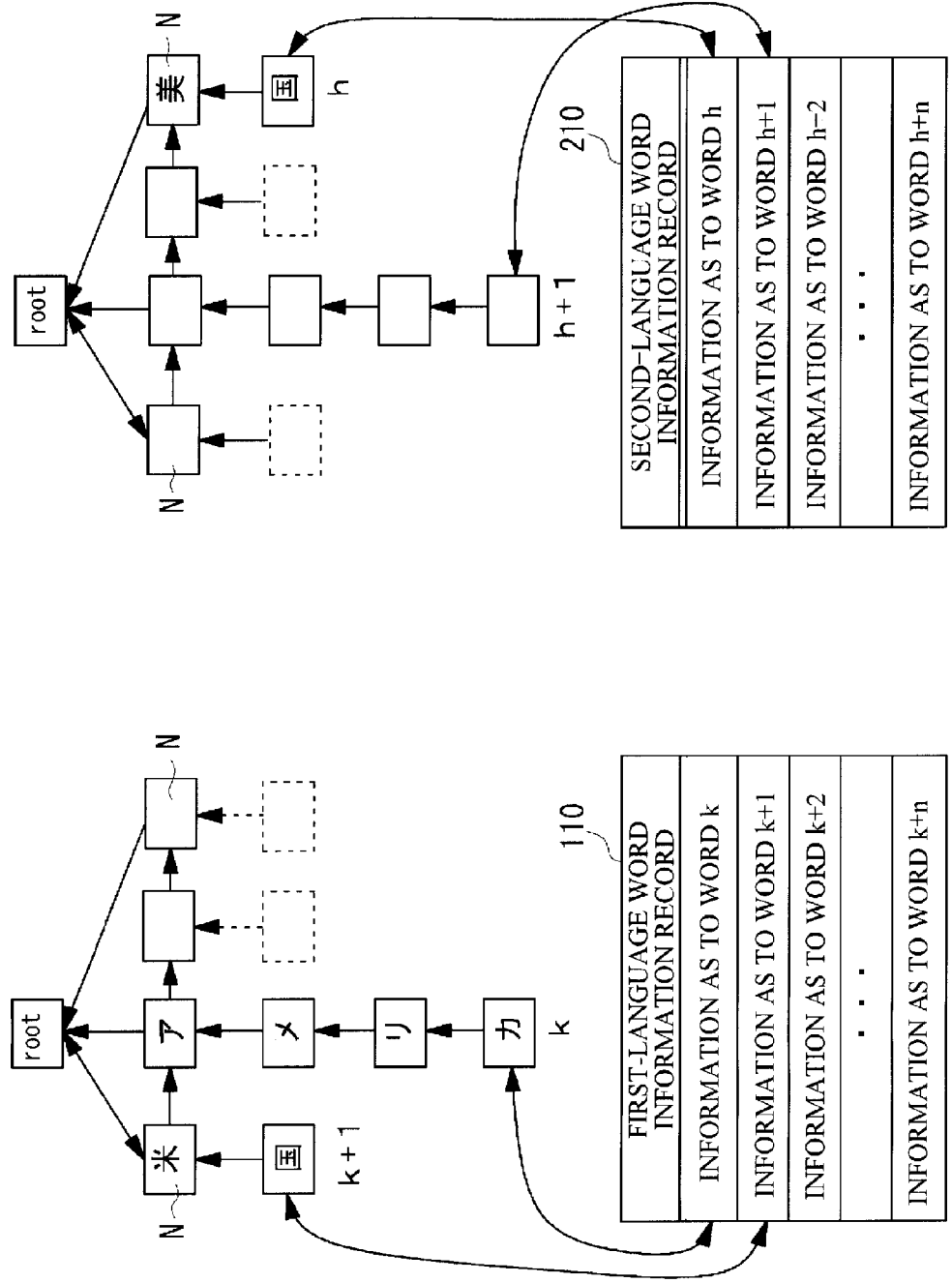
FIG. 4 shows TRIE structures in accordance with the exemplary embodiment of the present invention.

Next, the word direct translation engine in accordance with this exemplary embodiment is described in detail. FIG. 4 illustrates the word search TRIE structures of the bilingual dictionary provided in the word direct translation engine 20 and the concept of a word information record structure. The bilingual dictionary includes a first-language word search TRIE structure 100 and a first-language word information record 110 associated with the word search TRIE structure 100, and a second-language word search TRIE structure 200 and a second-language word information record 210 associated with the word search TRIE structure 200.

Figure 5:
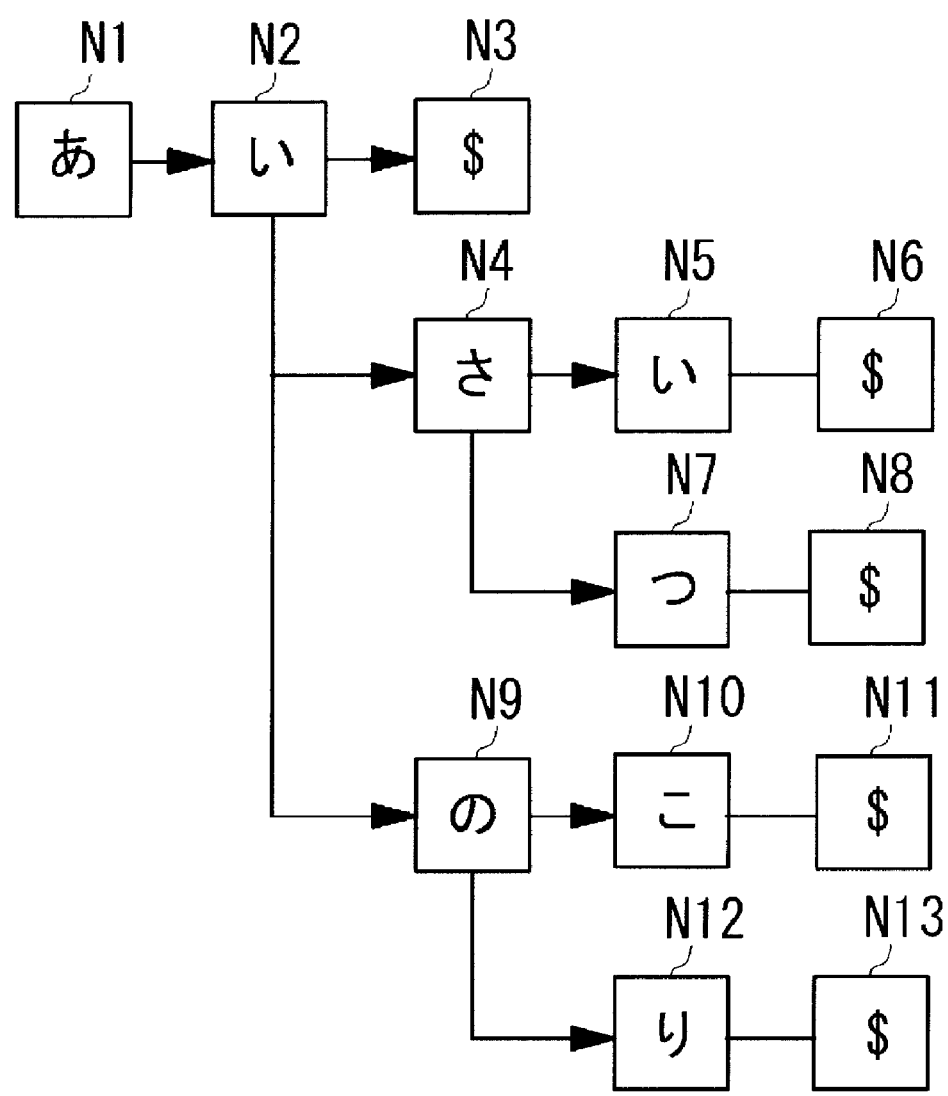
FIG. 5 illustrates a TRIE structure in detail.

In the field of linguistic information processing, a TRIE structure is a tree structure obtained by combining character strings that are common in a group of search keywords. For example, a TRIE structure formed from the five search keywords of "AI", "AISAI", "AISATSU", "AINOKO", and "AINORI" is as shown in FIG. 5. The symbol "$" in FIG. 5 may be used as the special character representing the end of a word. When a search is performed with the use of a TRIE structure, the search character string is scanned from the left, and the scanner moves along the tree, starting from the root (node N1) to the character allotted to each of nodes N2 through N13. In this manner, the word corresponding to the search character string is extracted. With the use of a TRIE structure, a search can be performed in a period of time proportional to the length of the search character string, regardless of the number of search keywords.

Referring back to FIG. 4, the bilingual dictionary in accordance with this exemplary embodiment holds the first-language word search TRIE structure 100 (hereinafter referred to as the first TRIE structure), the first-language word information record 110 that stores the translation information as to each word contained in the first TRIE structure 100, the second-language word search TRIE structure 200 (hereinafter referred to as the second TRIE structure), and the second-language word information record 210 that stores the translation information as to each word contained in the second TRIE structure 200.

In a case where the first language is Japanese and the second language is Chinese, when the word "America" in Japanese is stored in the first TRIE structure 100, the word "America" in Chinese is stored in the second TRIE structure 200. The word "America" in Japanese and the word "America" in Chinese are associated with each other in the translation information contained in the first and second word information records 110 and 210.

When the search character string of the word "America" in Japanese is input, for example, the CPU 38 scans the search character string of the word "America" from the left (from the character "A"), and moves from node to node, starting from the root of the first TRIE structure. The CPU 38 then determines whether there is a word or a path corresponding to the word "America". If there is the corresponding path or word, the word information record 110 corresponding to the word "America" is referred to, so as to identify the path or the word "America" in Chinese in the second TRIE structure 200. In this manner, the translation of the word "America" in Chinese is obtained. When the search character string of the word "America" in Chinese is input, the word information record 210 corresponding to the word "America" is referred to, so as to identify the path corresponding to the translation of the word "America" in Japanese in the first TRIE structure 100. Thus, the translation of the word "America" in Japanese is obtained. In this manner, the first and second word information records 110 and 210 are linked with each other, so as to prevent translation information from being lost in both languages.

When the word "USA" as a synonym for the word "America" is stored in the first TRIE structure 100, the translation information as to the word "America" in Chinese in the word information record 210 is linked with both words. Accordingly, the words "America" and "USA" in Japanese can be obtained from the word "America" in Chinese.

Figure 6:
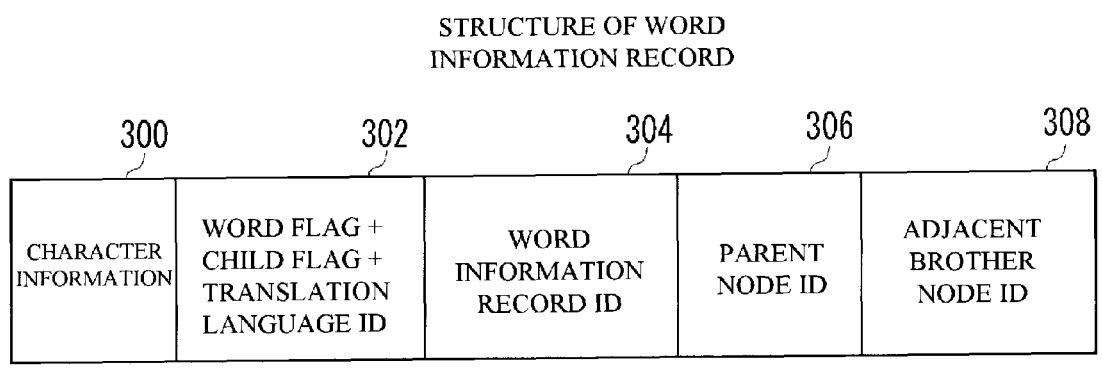
FIG. 6 shows the structure of a word information record.

As described above, to identify a word stored in the second TRIE structure based on a word stored in the first TRIE structure 100, the first-language word information record 110 is generated. To identify a word stored in the first TRIE structure based on a word stored in the second TRIE structure 200, the second-language word information record 210 is generated. FIG. 6 shows the structure of a word information record. The word information record includes character information 300, a word flag and child flag and language ID 302, a word information record ID 304, a parent node ID 306, and an adjacent brother node ID 308.

The character information 300 indicates the type of characters contained in the node, such as kanji, hiragana, katakana, or the alphabet. The word flag and child flag and translation language ID 302 is formed with one byte, and the word flag is formed with two bits. As shown in FIG. 7, when the word flag is "0", the corresponding node is an intermediate node. When the word flag is "1", the corresponding node is a word node (the information shown on the path from the root to the corresponding node represents the word). When the word flag is "2", the corresponding node is a pronunciation node (the information shown on the path from the root to the corresponding node represents the pronunciation). When the word flag is "3", the corresponding node is a word pronunciation node (the information shown on the path from the root to the corresponding node represents the word and its pronunciation).

The child flag is formed with one bit. As shown in FIG. 8A, when the child flag is "0", there is not a node existing in any lower level than the corresponding node. When the child flag is "1", there is at least one node below the corresponding node.

The translation language ID identifies the language in which the translation is made. As shown in FIG. 8B, when the language ID is "1", the language is Japanese. When the language ID is "2", the language is Chinese. When the language ID is "3", the language is English.

As shown in FIG. 9, the word information record ID 304 includes a word ID, a pronunciation ID, a part of speech ID, a priority level, synonymity information (a word number), a concept ID, a left linkage information ID, a right linkage information ID, a translation language ID, a translation ID, a next synonymous word information record ID, and remarks. The word ID is a node ID that identifies each word stored in a TRIE structure. In the case of the word "America" in the first TRIE structure shown in FIG. 4, for example, the word ID is the ID of the node at which the last character of the word is stored. The pronunciation ID indicates the pronunciation of the word, distinguishing the pronunciation in kanji from the pronunciation in hiragana and the likes. The part of speech ID identifies the part of speech of the word, such as a noun, a verb, or an adjective.

The synonymity information indicates the number of synonymous words. In the case of the word "America" in the first TRIE structure shown in FIG. 4, for example, the number of synonymous words is "1" ("USA"). The concept ID, the left linkage information ID, and the right linkage information ID are not essential, but are useful in translation on the basis of analysis.

The translation language ID identifies the language in which the translated word is written. In a case where the word "America" in Japanese is translated into Chinese, the translation language ID is the ID representing Chinese. In this case, the translation ID is the ID of the node at which the last character of the word "America" in Chinese is stored. The next synonymous word information record ID is the ID that identifies the record of the next word that is synonymous with the translation of the corresponding word. For example, if the translated word is "America" in Japanese and a synonym for the word is "USA" in Japanese in the word record of "America" in Chinese, the synonymous word record ID is the ID that identifies the word "USA" in Japanese. The remarks are comments or the likes, but are not essential.

The parent node ID 306 is the ID that identifies a node above the node identifying the subject word. The adjacent brother node ID 308 is the ID of an adjacent node that shares the same parent node with the subject node. Those node IDs are the information necessary in TRIE structures, but do not directly affect word translations. In a case where there are similar-sounding words, the number of such words may be contained in a word information record. In such a case, the TRIE structure corresponding to the word information record is associated with more than one word.

As shown in FIG. 4, where the word information record of the word "America" stored in the first TRIE structure 100 is k, the word information record k contains the information that indicates the path of the word "America" from the root, and the translation information (the translation language ID, the translation ID, and the synonymous word information record ID). Where the word information record of the word "America" stored in the second TRIE structure 200 is h, the word information record h contains the information that indicates the path of the word "America" from the root, and the translation information. The word information record h also contains the word information record k+1 of the word "USA" in Japanese as the synonymous word information record ID. In this manner, the translated words in the first and second languages are linked in both directions via the first and second word information records, and a translation from either language can be promptly made with certainty.

Referring now to FIGS. 10A through 10C, the structure of character information in TRIE structures is described. In FIG. 10A, each node in the TRIE structure is shown as one character formed with two bytes. In FIG. 10B, each language is converted into Unicode, and a higher byte (higher 8 bits) or a lower byte (lower 8 bits) is allotted to each node. Accordingly, each one character is formed with one higher byte and one lower byte. With the structure shown in FIG. 10B, the search speed becomes higher than the search speed with the structure shown in FIG. 10A, as the number of nodes in the horizontal direction in the TRIE structure becomes smaller (256). However, the amount of information increases, as the number of nodes in the depth direction becomes larger. The structure shown in FIG. 10C is a combination of the structure shown in FIG. 10A and the structure shown in FIG. 10B.

Figure 11:
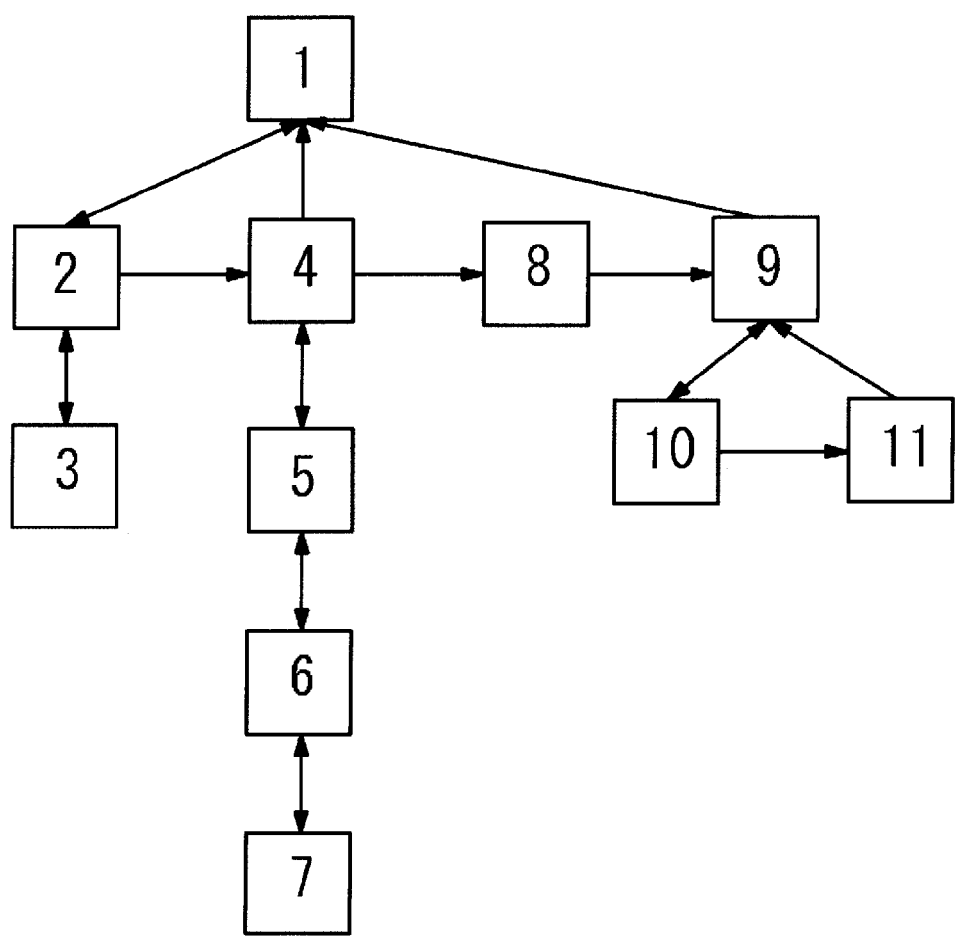
FIG. 11 shows node record ID allotment.
Figure 12:
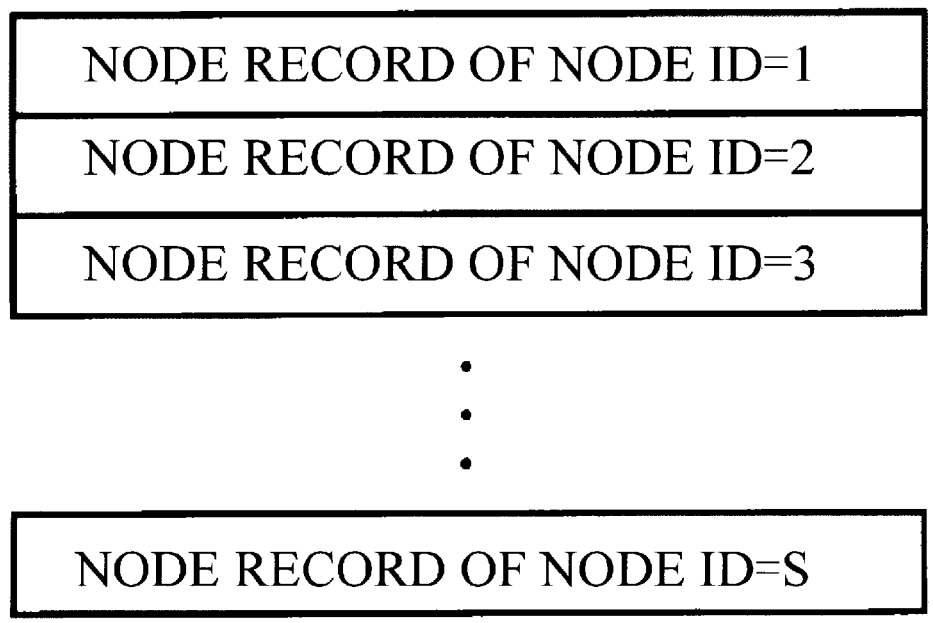
FIG. 12 shows an array of node IDs.

Next, the node ID allotment is described. FIG. 11 illustrates a node ID allotment method. In each TRIE structure, a search is performed in depth first order, and the search number is increased from "1" or "0". In this manner, node IDs are allotted to the respective nodes. After the node IDs are allotted, the records corresponding to the node IDs are arranged and stored in accordance with the node IDs, as shown in FIG. 12. As the records are arranged in accordance with the node IDs, the node information corresponding to each node ID can be instantly accessed. In this exemplary embodiment, only translations are obtained, and the word information (translation information) such as the pronunciations and the part of speech of the words shown in FIG. 9 cannot be obtained accurately. If accurate information as to translations as shown in FIG. 9 is required, a word search structure and a word information record structure in accordance with second and third exemplary embodiments (described later) should be employed.

Next, the word record storage is described. Where there is one-to-one correspondence between the words in the first language and the words in the second language, each one word has one word information record. However, many words have more than one part of speech (or meaning), and many translational relations are not represented by one-to-one correspondence.

If a word k has more than one part of speech, and one of the part of speech has more than one translation, more than one information record is prepared for the word k, and the records are linked via pointers in series. Translation information is then stored in each corresponding record. As shown in FIG. 13, the information as to a part of speech 1 and a translation 1 is stored in a record of the word k of the first language, and the information as to the part of speech 1 and a translation 2 is stored in a record linked with the above record via a pointer. Here, the pointer may be the next synonymous word information record ID shown in FIG. 6. Next, the rules in word selection are described. Preferably, only nouns, pronouns, adjectives, adverbs, verbs, and special terms are translated. If the translational relation indicates one-to-one correspondence, the primary corresponding translation is selected. If there is one-to-n correspondence (n>1), the class attributes of the n words are checked, and each word having the same part of speech as the word of the source language is selected. If there is only one translation having the same part of speech as the word of the source language, the single word is selected. If there are two or more words having the same part of speech as the word of the source language, a possible translation may be selected according to the priority level, or a possible translation may be arbitrarily selected.

In an example case where the word "America" in Chinese is to be translated into the words "America" and "USA" in Japanese, two records 320 and 322 are generated for the word "America" in the Chinese dictionary, and the two records 320 and 322 are linked with each other via a pointer. In the Japanese dictionary, a record 330 for the word "USA" and a record 332 for the word "America" are generated. The record 320 for the word "America" in Chinese contains the translation information as to the word "America" in Japanese, and the record 322 for the word "America" in Chinese contains the translation information as to the word "USA" in Japanese.

The records 330 and 332 for the words "America" and "USA" in Japanese are associated with the translation information as to the word "America" in Chinese, so that the word "America" in Chinese is referred to, as shown in dotted lines in FIG. 13.

Next, another method for storing word information records is described. In the example illustrated in FIG. 13, identical records are generated, and the amount of memory used becomes larger accordingly. To save the memory space, only one information record is used for the word k, and two or more records containing the translation information as to the words in a synonymous word information array are identified based on the single information record of the word k. The minimum amount of translation information is then recorded in the synonymous word information array. As shown in FIG. 14, the information record of the word k of the first language and a synonymous word information array are prepared. The records in the synonymous word information array include information as to a translation 2 of a part of speech 1, a translation 3 of the part of speech 1, and a translation 1 of a part of speech 2, for example. Each record in the synonymous word information array contains the minimum amount of translation information, which is a priority level, a concept ID, a language ID, a translation ID, and a next synonymous word information record pointer.

In a case where words in Japanese are searched for based on the word "America" in Chinese, as shown in FIG. 14, a record 320 for the word "America" in Chinese is created, and a record 324 to be contained in the synonymous word information array is created. According to the record 320, the word "USA" in Japanese is referred to, and, according to the record 324 in the synonymous word information array, the word "America" in Japanese is referred to.

Next, the rules in word selection are described. Preferably, only nouns, pronouns, adjectives, adverbs, verbs, and special terms are translated. If the translational relation indicates one-to-one correspondence, the single corresponding word is selected. If there is one-to-n correspondence (n>1), the class attributes of the n words are checked, and possible translations may be selected one by one from the words having the same part of speech as the word of the source language. Alternatively, a possible translation may be arbitrarily selected.

Figure 15:
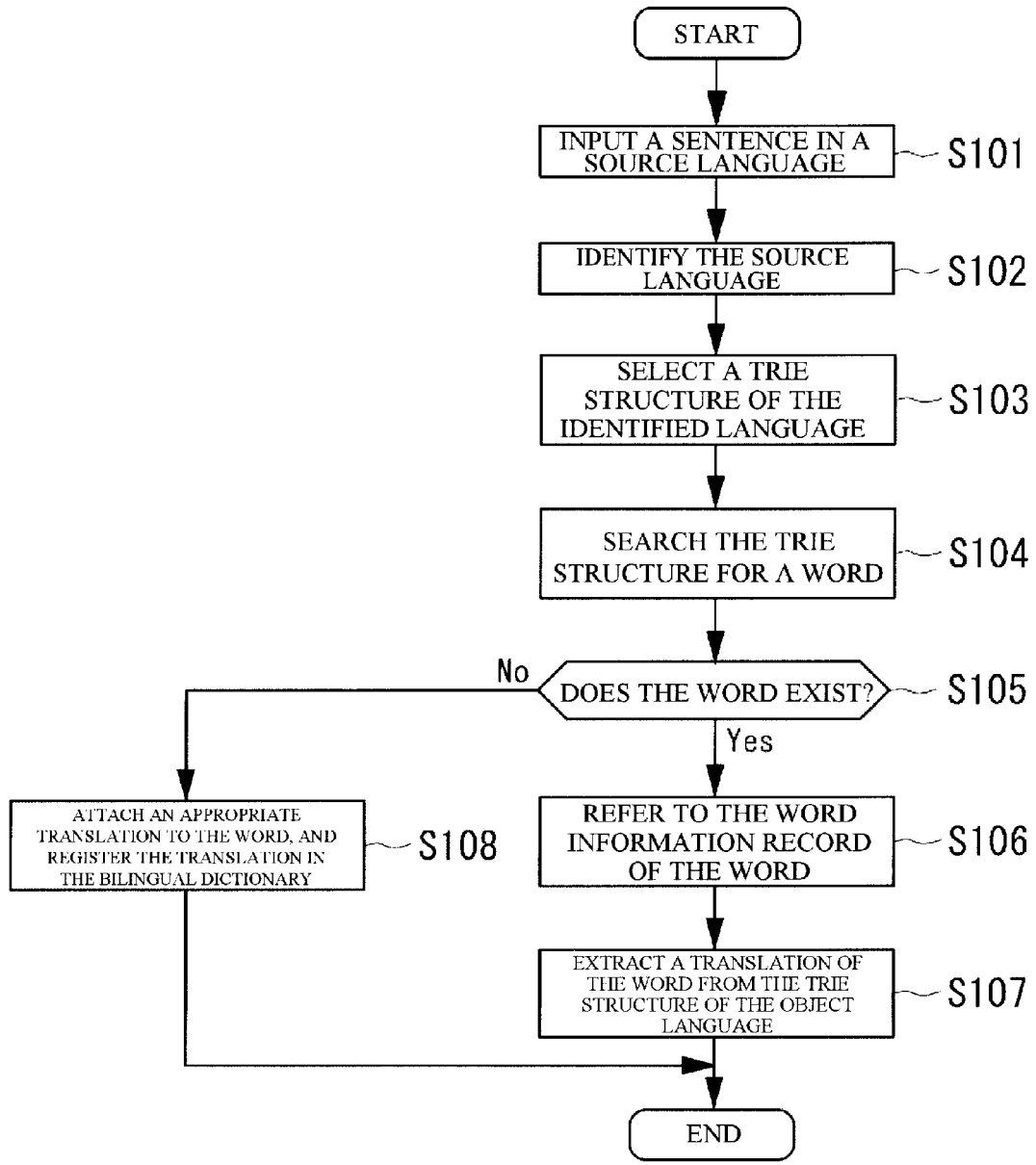
FIG. 15 is a flowchart of a word translating operation.

FIG. 15 is a flowchart of an operation of the word translation device. First, when a word as a result of analysis of a text sentence in the source language, or a word that is designated by a user, is input (step S101), the CPU 38 identifies the type of the source language (step S102). The CPU 38 then selects a TRIE structure of the bilingual dictionary corresponding to the identified language (step S103), and compares the input word with the words stored in the TRIE structure (step S104). If there is a corresponding word in the TRIE structure (step S105), the CPU 38 refers to the word information record of the corresponding word (step S106), and extracts the word from a TRIE structure in the object language that is referred to in accordance with the word information record (step S107). The extracted word is displayed by the object language text sentence creating unit 22 (step S108).

If the input word does not exist (step S105), a failure in translation is output onto the display. In such a case, an appropriate translation is attached to the input word by a human translator. The translation is then registered in the bilingual dictionary, and is learned by the learning function (step S108).

Figure 16:
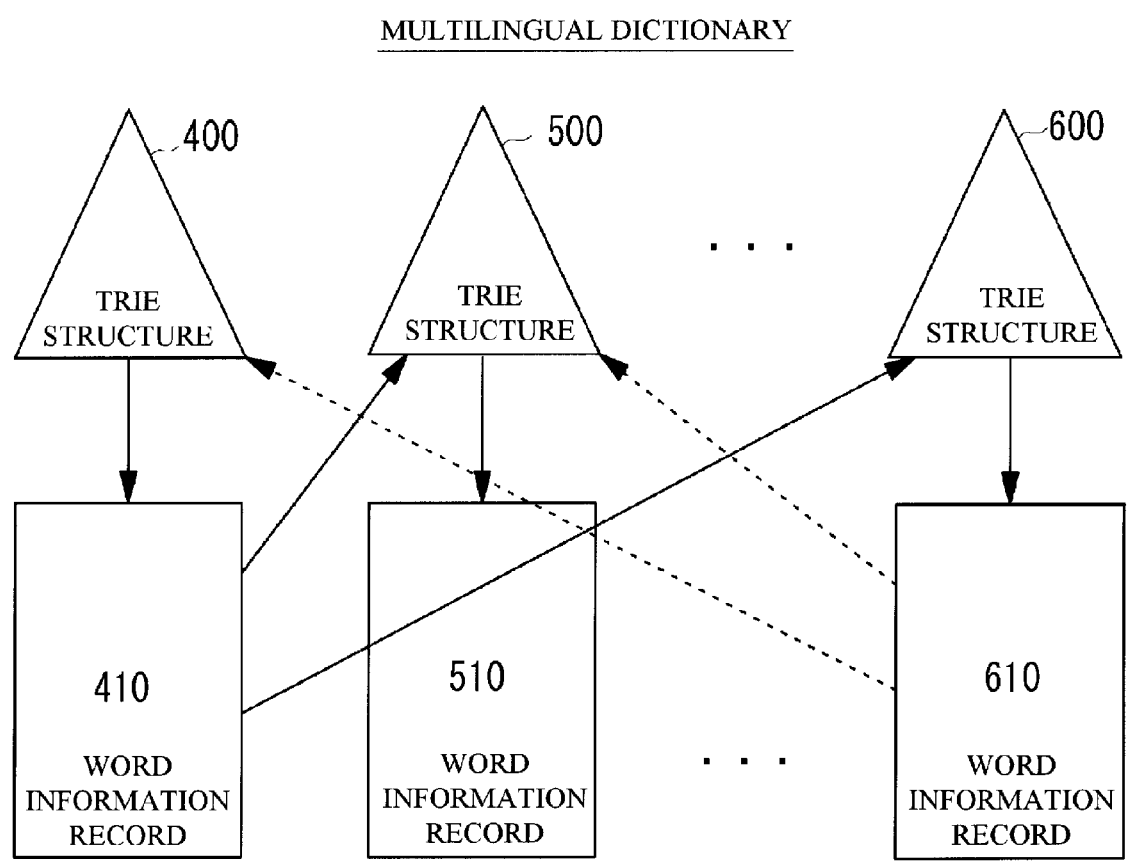
FIG. 16 illustrates a multilingual dictionary of a multilingual word translation device in accordance with a second exemplary embodiment of the present invention.

Next, a second exemplary embodiment of the present invention is described. The second exemplary embodiment concerns multilingual translation, or word translation among N languages. The structure of a multilingual dictionary used in the multilingual translation is shown in FIG. 16. As shown in FIG. 16, a TRIE structure of the first language, a TRIE structure of the second language, and a TRIE structure of the Nth language are created, and the word search TRIE of each language is stored. At the same time, a first-language word information record 410, a second-language word information record 510, and a Nth-language word information record 610 are created to match the respective TRIE structures.

Each word information record contains translation information as to more than one language. For example, a word information record of Japanese contains a record that stores English translation information and a record that stores Chinese translation information. With this arrangement, a word of either English or Chinese can be detected based on a Japanese word. A user can issue an instruction as to whether an English word or a Chinese word is to be detected. Word translations from English into Japanese and word translations from Chinese into Japanese can also be performed. The method for storing the word information records in this exemplary embodiment may be the same as the method illustrated in FIG. 13 or 14.

As described above, as a word search TRIE structure and a word information record are created for each language, word translations can be performed among several languages. Thus, higher usability can be achieved.

Figure 17:
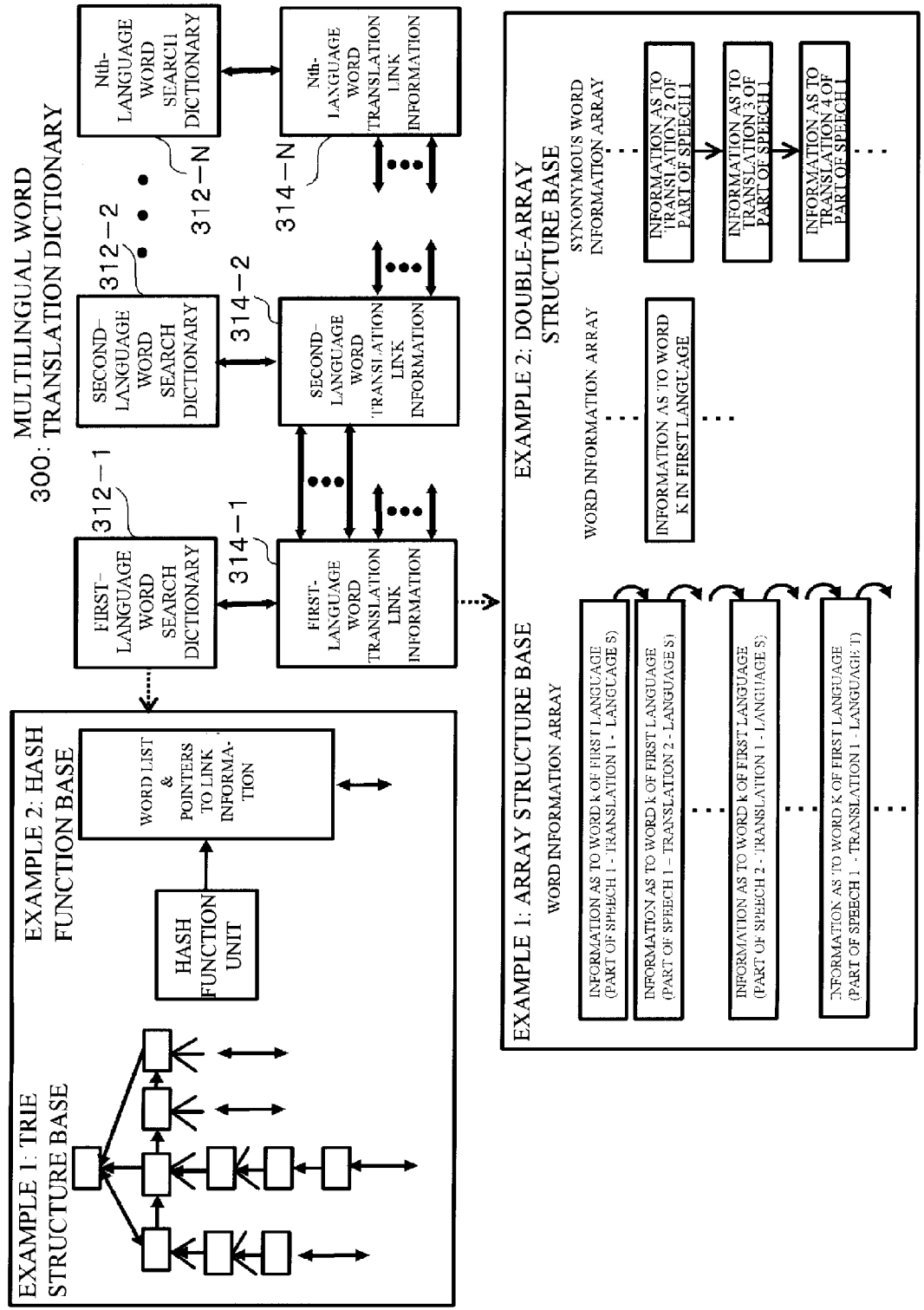
FIG. 17 shows the structure of a multilingual word translation dictionary to be used in a third exemplary embodiment of the present invention.

Next, a third exemplary embodiment of the present invention is described. FIG. 17 illustrates the structure of a multilingual word translation dictionary 300 to be used in the third exemplary embodiment. The multilingual word translation dictionary 300 is formed with a first-language word search dictionary 312-1 through a Nth-language word search dictionary 312-N that are provided for the first through Nth languages (the first-language word search dictionary 312-1 through the Nth-language word search dictionary 312-N will be hereinafter referred to collectively as the "word search dictionary 312" where appropriate), and first-language word translation link information 314-1 through Nth-language word translation link information 314-N that are provided for the first through Nth languages (the first-language word translation link information 314-1 through the Nth-language word translation link information 314-N will be hereinafter referred to collectively as the "word translation link information 314" where appropriate).

Each word search dictionary 312 has a structure based on a TRIE structure or a hash function. The word translation link information 314 indicates the association between each word of one language and each corresponding word of another language. The word translation link information 314 has a structure based on a sequential structure that has only a word information array list formed with word information records, or a structure based on a double sequential structure that has a word information array list formed with word information records and a synonymous word array list formed with synonymous word information records.

Figure 18:
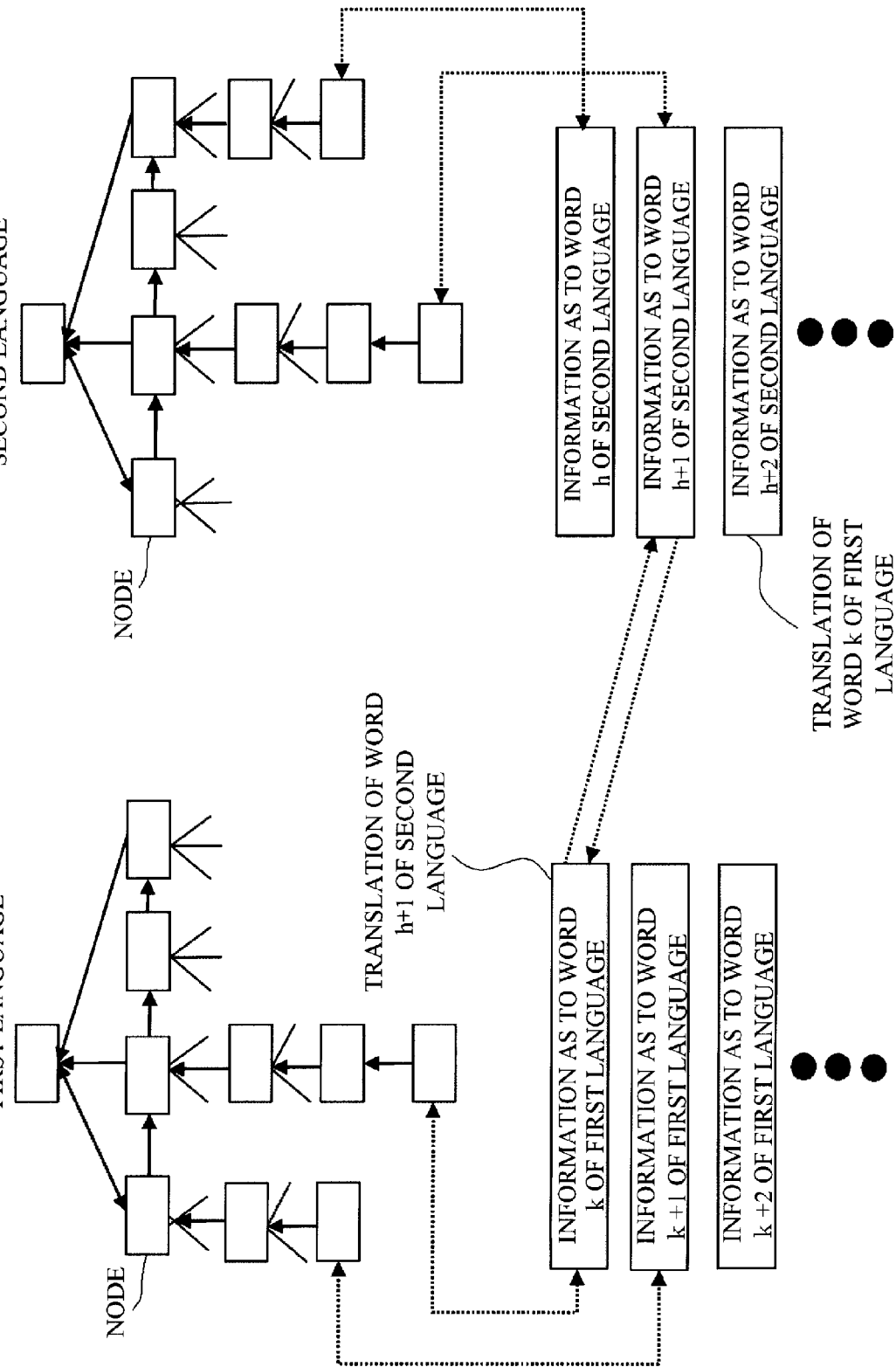
FIG. 18 is a conceptual diagram of a first example of the multilingual word translation dictionary.

FIG. 18 is a conceptual diagram of a first example structure of the multilingual word translation dictionary 300. In the example structure shown in FIG. 18, each word search dictionary is based on a TRIE structure. Where translations are to be made between two languages, the first-language word search dictionary has a first-language word search TRIE structure ("first TRIE structure"), and the first-language word translation link information is formed with information as to the words contained in the first TRIE structure (word information records). The word information records contain pointers that indicate the association with the words in the second language. Likewise, the second-language word search dictionary has a second-language word search TRIE structure ("second TRIE structure"), and the second-language word translation link information is formed with information as to the words contained in the second TRIE structure (word information records). The word information records contain pointers that indicate the association with the words in the first language. In FIG. 18, a word k of the first language and a word h+1 in the second language are in a translational relationship, and are associated with each other. In a case where two or more part of speech exist for a word and two or more translations exist for a part of speech, word information records of the word are prepared for the respective part of speech and the respective translations, and the word information records are linked with one another by the pointers contained in the word information records.

Figure 19:
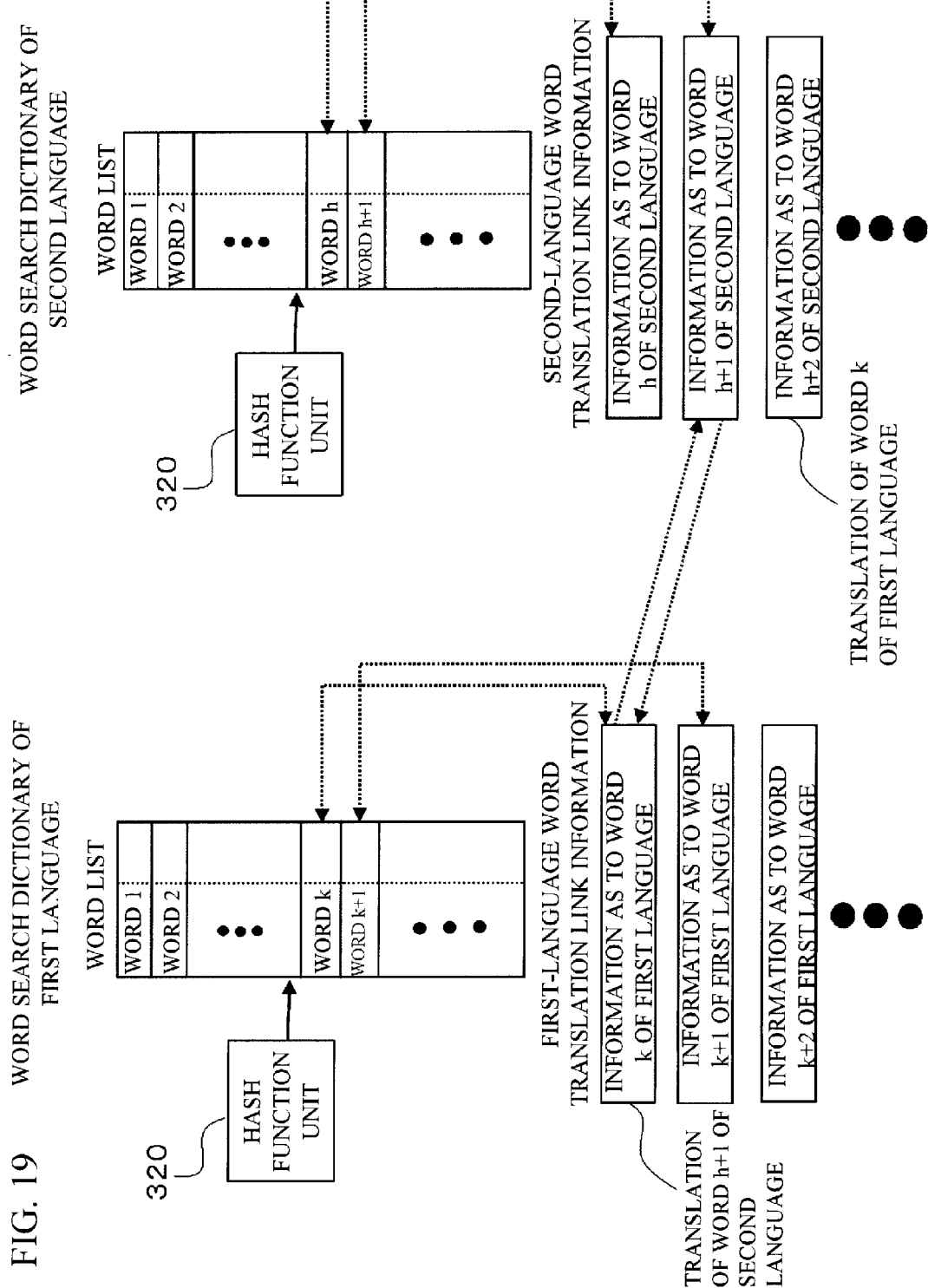
FIG. 19 is a conceptual diagram of a second example of the multilingual word translation dictionary.

FIG. 19 is a conceptual diagram of a second example structure of the multilingual word translation dictionary 300. In the example structure shown in FIG. 19, each word search dictionary is based on a hash function, and the word translation link information is based on a sequential structure.

In a case where translations are to be performed between two languages in this structure based on a hash function, the first-language word search dictionary has a word list that contains pointer information as to words in the first language and the word information records in the word translation information dictionary corresponding to those words. Likewise, the second-language word search dictionary has a word list that contains pointer information as to words in the second language and the word information records in the word translation information dictionary corresponding to those words. The word translation link information as to the first language and the second language is the same as the information structure shown in FIG. 18, and therefore, explanation of it is omitted herein. A hash function unit 320 will be described later in detail.

Figure 20:
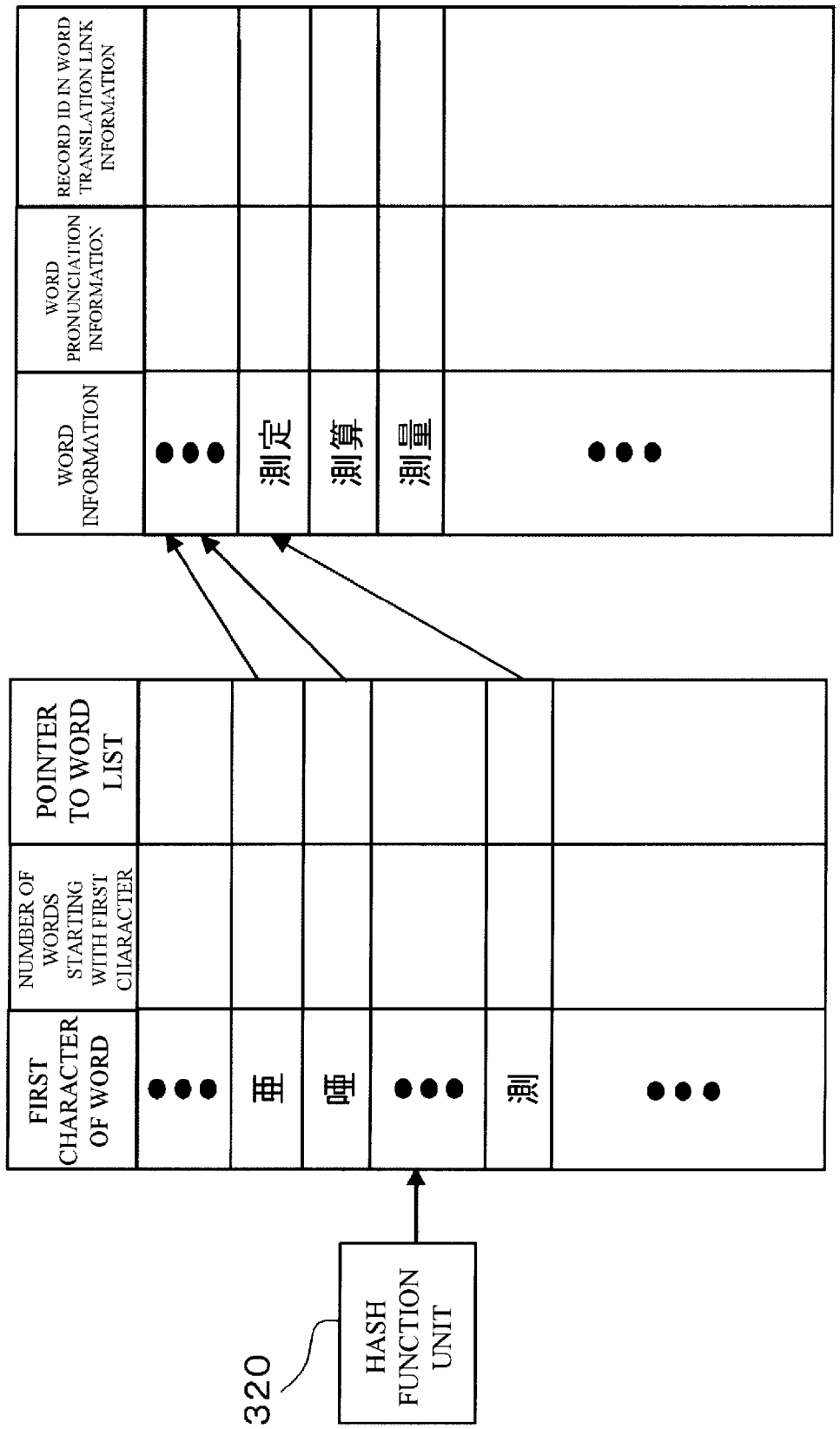
FIG. 20 illustrates the structure of a word search dictionary based on a hash function.

FIG. 20 illustrates the structure of a word search dictionary based on a hash function. The hash function unit 320 converts all the character codes in the corresponding language into a continuous character code. A first character list contains the information as to the first characters of words that are characters converted from character codes by the hash function unit 320, the numbers of words that start with the first characters, and the pointer information as to the records in the word list corresponding to the words starting with the first characters. The word list contains the information as to each word, word pronunciation information, and record IDs of the word information in the word translation link information corresponding to those words.

Where a word translation is to be performed, the word direct translation engine 20 identifies the record in the first character list corresponding to the first character of an input word. Based on the number of words in the identified record and the pointer information as to the word list, the word direct translation engine 20 detects the records in the word list corresponding to the words starting with the first character of the input word. The word direct translation engine 20 then compares the input word with the word information in all the identified records, and identifies the input word.

Next, examples of word translations to be performed by the word direct translation engine 20 are described. Where an array structure base is employed for the word translation link information, each word information record has the structure shown in FIG. 21A. Each word information record is uniquely identified by a word information record ID, and contains the word ID of the subject word, the pronunciation ID, the part of speech ID, the priority level, the synonymity information, a word/chunk identification flag, an area classification ID, a concept ID, a left linkage information ID, a right linkage information ID, a translation language ID, a translation information record ID, a next synonymous word information record ID, and remarks. If there is not a word information record corresponding to the next synonymous word, the next synonymous word information record ID is "0". The translation language ID includes the language ID shown in FIG. 21B and the child flag shown in FIG. 21C. Those are the same as the language ID and the child flag shown in FIGS. 8A and 8B.

In a case where a double-array structure base is employed for word translation link information, each word information record has the structure shown in FIG. 22. Each word information record is uniquely identified by a word information record ID, and contains the word ID of the subject word, the pronunciation ID, the part of speech ID, the priority level, the synonymity information, a word/chunk identification flag, an area classification ID, a concept ID, a left linkage information ID, a right linkage information ID, a synonymous word information record ID, and remarks. In the case where a double-array structure base is employed for the word translation link information, each synonymous word information record has the structure shown in FIG. 23. Each synonymous word information record is uniquely identified by a synonymous word information record ID, and contains the language ID of the subject translation, the word information record ID of the parent word, the synonymous word information record ID of the subject translation, and the synonymous word information record ID of the next synonymous word. If there is not a synonymous word information record corresponding to the next synonymous word, the synonymous word information record ID of the next synonymous word is "0".

Figure 24:
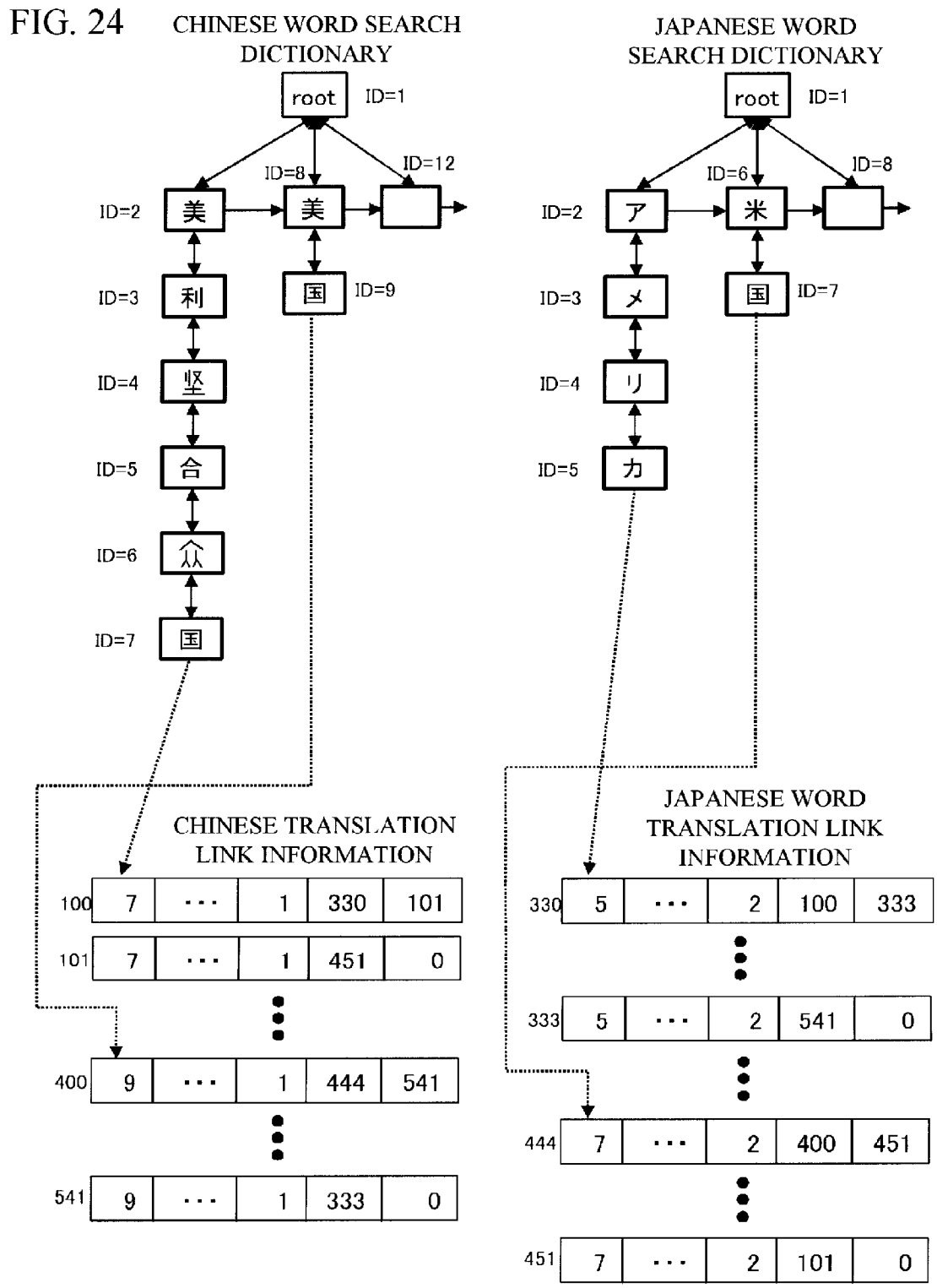
FIG. 24 illustrates the structure of a bilingual dictionary to be used in word translation between Japanese and Chinese, where an array structure base is employed.

FIG. 24 illustrates the structure of a bilingual dictionary to be used in word translation between Japanese and Chinese in a case where an array structure base is employed for the word translation link information. In a TRIE structure in the Japanese word search dictionary, the word "America" in Japanese and the word "USA" in Japanese as a synonym for the word "America" are stored. In a TRIE structure in the Chinese word search dictionary, the word "America" in Chinese and the word "USA" in Chinese as a synonym for the word "America" are stored. The word "America" in Chinese is written as follows: 美利坚合众国

In this case, the Japanese word translation link information contains the word information record having a word information record ID "330" and the word information record having a word information record ID "333" corresponding to the word "America", and the word information record having a word information record ID "444" and the word information record having a word information record ID "451" corresponding to the word "USA".

The Chinese word translation link information contains the word information record having a word information record ID "100" and the word information record having a word information record ID "101" corresponding to the word "America", and the word information record having a word information record ID "400" and the word information record having a word information record ID "541" corresponding to the word "USA". The word "America" in Japanese is synonymous with the word "USA" in Japanese, and the word "America" in Chinese is synonymous with the word "USA" in Chinese.

The word information record having the ID "330" in the Japanese word translation link information contains the word ID "5" of the subject word "America" in Japanese, the language ID "2" of the Chinese language as the translation language, the ID "100" of the word information record of the word "America" in Chinese as the translation language, and the ID "333" of the word information record of the next synonymous word. The word information record having the ID "333" in the Japanese word translation link information contains the word ID "5" of the subject word "America", the language ID "2" of the Chinese language as the translation language, the ID "541" of the word information record of the word "USA" in Chinese as a synonym for the word "America" in Chinese as the translation language or the word "USA" in Chinese as the translation language that is a translation of the word "USA" in Japanese as a synonym for the word "America" in Japanese, and the next synonymous word information record ID "0" indicating that there is not a word information record of the next synonymous word.

Also, the word information record having the ID "444" in the Japanese word translation link information contains the word ID "7" of the subject word "USA" in Japanese, the language ID "2" of the Chinese language as the translation language, the ID "400" of the word information record of the word "USA" in Chinese as the translation language, and the ID "451" of the word information record of the next synonymous word. The word information record having the ID "451" in the Japanese word translation link information contains the word ID "7" of the subject word "USA", the language ID "2" of the Chinese language as the translation language, the ID "101" of the word information record of the word "America" in Chinese as a synonym for the word "USA" in Chinese as the translation language or the word "America" in Chinese as the translation language that is a translation of the word "America" in Japanese as a synonym for the word "USA" in Japanese, and the next synonymous word information record ID "0" indicating that there is not a word information record of the next synonymous word.

Meanwhile, the word information record having the ID "100" in the Chinese word translation link information contains the word ID "7" of the subject word "America" in Chinese, the language ID "1" of the Japanese language as the translation language, the ID "330" of the word information record of the word "America" in Japanese as the translation language, and the ID "101" of the word information record of the next synonymous word. The word information record having the ID "101" in the Chinese word translation link information contains the word ID "7" of the subject word "America", the language ID "1" of the Japanese language as the translation language, the ID "451" of the word information record of the word "USA" as a synonym for the word "America" in Japanese as the translation language or the word "USA" in Japanese as the translation language that is a translation of the word "USA" in Chinese as a synonym for the word "America" in Chinese, and the next synonymous word information record ID "0" indicating that there is not a word information record of the next synonymous word.

Also, the word information record having the ID "400" in the Chinese word translation link information contains the word ID "9" of the subject word "USA" in Chinese, the language ID "1" of the Japanese language as the translation language, the ID "444" of the word information record of the word "USA" in Japanese as the translation language, and the ID "541" of the word information record of the next synonymous word. The word information record having the ID "541" in the Chinese word translation link information contains the word ID "9" of the subject word "USA" in Chinese, the language ID "1" of the Japanese language as the translation language, the ID "333" of the word information record of the word "America" as a synonym for the word "USA" in Japanese as the translation language or the word "America" in Japanese as the translation language that is a translation of the word "America" in Chinese as a synonym for the word "USA" in Chinese, and the next synonymous word information record ID "0" indicating that there is not a word information record of the next synonymous word.

As described above, Japanese words and Chinese words are linked with each other through the Japanese and Chinese word translation link information. Where the word "America" in Chinese is translated into Japanese, the word direct translation engine 20 detects the word information record having the ID "100" that contains the word ID "7" of the word "America" in Chinese in the Chinese word translation link information and the language ID "1" of the Japanese language. The word direct translation engine 20 then detects the word information record having the ID "101" that is the word information record of the next synonymous word contained in the word information record having the ID "100". Based on the word information record ID "330" corresponding to the Japanese word as a translation contained in the word information record having the ID "100", the word direct translation engine 20 detects the word information record having the ID "330" in the Japanese word translation link information. Also, based on the word information record ID "451" corresponding to the Japanese word as a translation contained in the word information record having the ID "101", the word direct translation engine 20 detects the word information record having the ID "451" in the Japanese word translation link information. Based on the word ID "5" contained in the word information record having the ID "330", the word direct translation engine 20 extracts the word "America" from the Japanese word search dictionary. Based on the word ID "7" contained in the word information record having the ID "451", the word direct translation engine 20 extracts the word "USA" from the Japanese wore search dictionary. Through this operation, the word "America" in Chinese is translated into the words "America" and "USA" in Japanese.

Figure 25:
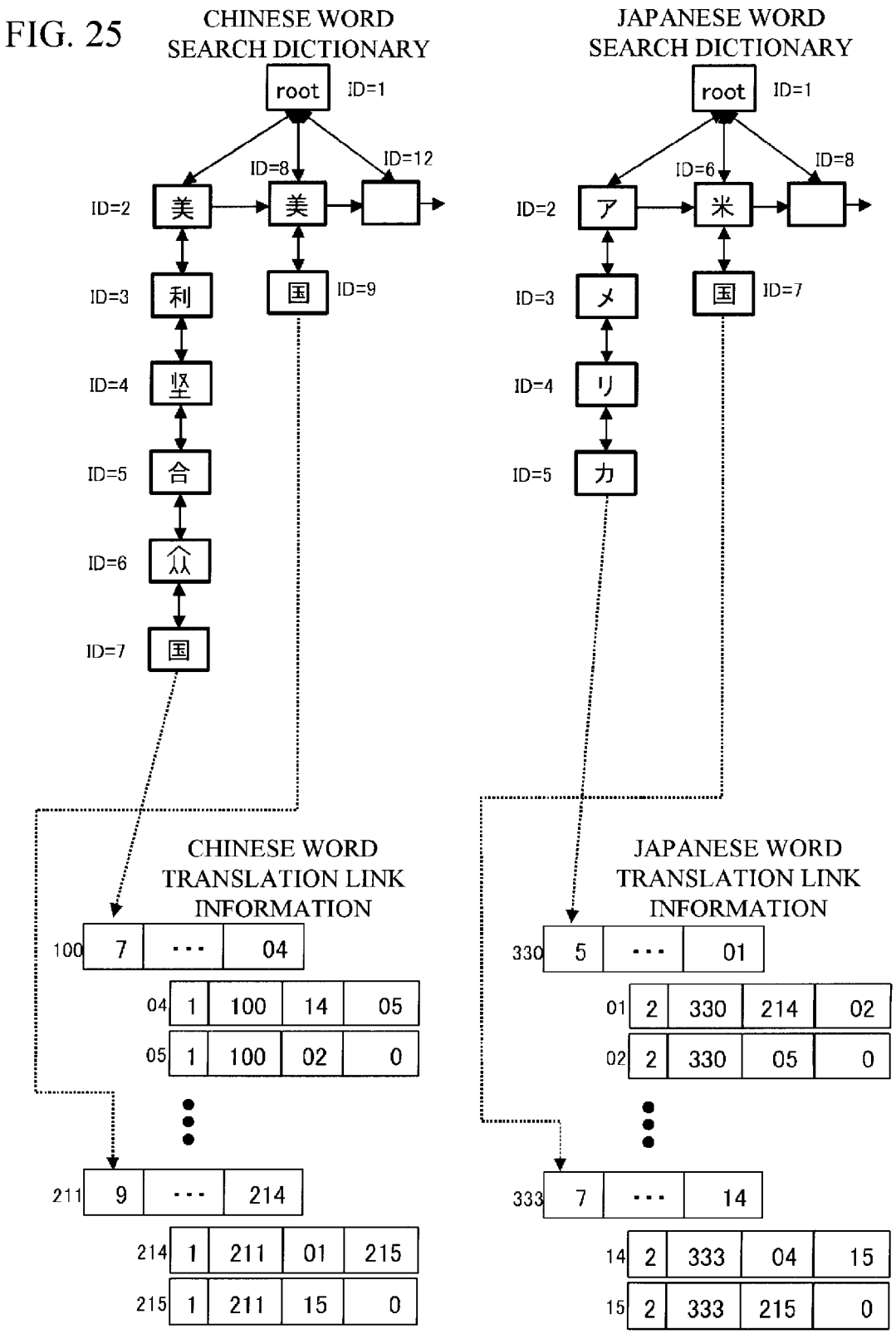
FIG. 25 illustrates the structure of a bilingual dictionary to be used in word translation between Japanese and Chinese, where a double-array structure base is employed.

FIG. 25 illustrates the structure of a bilingual dictionary to be used in word translation between Japanese and Chinese in a case where a double-array structure base is employed for the word translation link information. The TRIE structures in the Japanese and Chinese word search dictionaries are the same as the structure shown in FIG. 23, and therefore, explanation of them is omitted herein.

The Japanese word translation link information contains the word information record having the word information record ID "330" corresponding to the word "America", and the word information record having the word information record ID "333" corresponding to the word "USA". The Japanese word translation link information further contains the synonymous word information records that have the IDs "01" and "02", and have the word information record of the ID "330" as a parent record, and the synonymous word information records that have the IDs "14" and "15", and have the word information record of the ID "333" as a parent record.

The Chinese word translation link information contains the word information record having the word information record ID "100" corresponding to the word "America", and the word information record having the word information record ID "211" corresponding to the word "USA". The Chinese word translation link information further contains the synonymous word information records that have the IDs "04" and "05", and have the word information record of the ID "100" as a parent record, and the synonymous word information records that have the IDs "214" and "215", and have the word information record of the ID "211" as a parent record.

The word information record having the ID "330" in the Japanese word translation link information contains the word ID "5" of the subject word "America" in Japanese, and the ID "01" of the synonymous word information record as a child record. The synonymous word information record having the ID "01" contains the language ID "2" of the Chinese language as the translation language, the ID "330" of the word information record as the parent record, the ID "214" of the synonymous word information record as a child record of the word information record corresponding to the word "USA" in Chinese as a synonym for the subject word in Chinese as the translation language, and the ID "02" of the synonymous word information record of the next synonymous word. The synonymous word information record having the ID "02" contains the language ID "2" of the Chinese language as the translation language, the ID "330" of the word information record as the parent record, the ID "05" of the synonymous word information record as a child record of the word information record corresponding to the word "America" in Chinese as the translation language, and the next synonymous word information record ID "0" indicating that there is not a synonymous word information record of the next synonymous word.

The word information record having the ID "333" in the Japanese word translation link information contains the word ID "7" of the subject word "USA" in Japanese, and the ID "14" of the synonymous word information record as a child record. The synonymous word information record having the ID "14" contains the language ID "2" of the Chinese language as the translation language, the ID "333" of the word information record as the parent record, the ID "04" of the synonymous word information record as a child record of the word information record corresponding to the word "America" in Chinese as a synonym for the subject word in Chinese as the translation language, and the ID "15" of the synonymous word information record of the next synonymous word. The synonymous word information record having the ID "15" contains the language ID "2" of the Chinese language as the translation language, the ID "333" of the word information record as the parent record, the ID "215" of the synonymous word information record as a child record of the word information record corresponding to the word "USA" in Chinese as the translation language, and the next synonymous word information record ID "0" indicating that there is not a synonymous word information record of the next synonymous word.

Meanwhile, the word information record having the ID "100" in the Chinese word translation link information contains the word ID "7" of the subject word "America" in Chinese, and the ID "04" of the synonymous word information record as a child record. The synonymous word information record having the ID "04" contains the language ID "1" of the Japanese language as the translation language, the ID "100" of the parent word information record, the ID "14" of the synonymous word information record as a child record of the word information record corresponding to the word "USA" in Japanese as a synonym for the subject word in Japanese as the translation language, and the ID "05" of the synonymous word information record of the next synonymous word. The synonymous word information record having the ID "05" contains the language ID "1" of the Japanese language as the translation language, the ID "100" of the parent word information record, the ID "02" of the synonymous word information record as a child record of the word information record corresponding to the word "America" in Japanese as the translation language, and the next synonymous word information record ID "0" indicating that there is not a synonymous word information record of the next synonymous word.

The word information record having the ID "211" in the Chinese word translation link information contains the word ID "9" of the subject word "USA" in Chinese, and the ID "214" of the synonymous word information record as the child record. The synonymous word information record having the ID "214" contains the language ID "1" of the Japanese language as the translation language, the ID "211" of the parent word information record, the ID "01" of the synonymous word information record as a child record of the word information record corresponding to the word "America" in Japanese as a synonym for the subject word in Japanese as the translation language, and the ID "215" of the synonymous word information record of the next synonymous word. The synonymous word information record having the ID "215" contains the language ID "1" of the Japanese language as the translation language, the ID "211" of the parent word information record, the ID "15" of the synonymous word information record as a child record of the word information record corresponding to the word "USA" in Japanese as the translation language, and the next synonymous word information record ID "0" indicating that there is not a synonymous word information record of the next synonymous word.

As described above, Japanese words and Chinese words are linked with each other through the Japanese and Chinese word translation link information. Where the word "America" in Chinese is translated into Japanese, the word direct translation engine 20 detects the word information record having the ID "100" that contains the word ID "7" of the word "America" in Chinese in the Chinese word translation link information. Based on the synonymous word information record ID "04" contained in the word information record having the ID "100", the word direct translation engine 20 detects the synonymous word information record having the ID "04". Based on the synonymous word information record ID "05" corresponding to the next synonymous word contained in the synonymous word information record having the ID "04", the word direct translation engine 20 detects the synonymous word information record having the ID "05". Based on the synonymous word information record IDs "02" and "14" as the child records of the word information record corresponding to the Japanese words as translations contained in the detected synonymous word information records having the IDs "04" and "05", the word direct translation engine 20 detects the synonymous word information records having the IDs "02" and "14" as child records of the word information records corresponding to the Japanese word.

Based on the parent word information record IDs "330" and "333" contained in the detected synonymous word information records having the IDs "02" and "14", the word direct translation engine 20 detects the word information records having the ID "330" and the ID "333". Based on the word ID "5" contained in the word information record having the ID "330", the word direct translation engine 20 extracts the word "America" from the Japanese word search dictionary. Based on the word ID "7" contained in the word information record having the ID "333", the word direct translation engine 20 extracts the word "USA" from the Japanese wore search dictionary. Through this operation, the word "America" in Chinese is translated into the words "America" and "USA" in Japanese.

Figure 26:
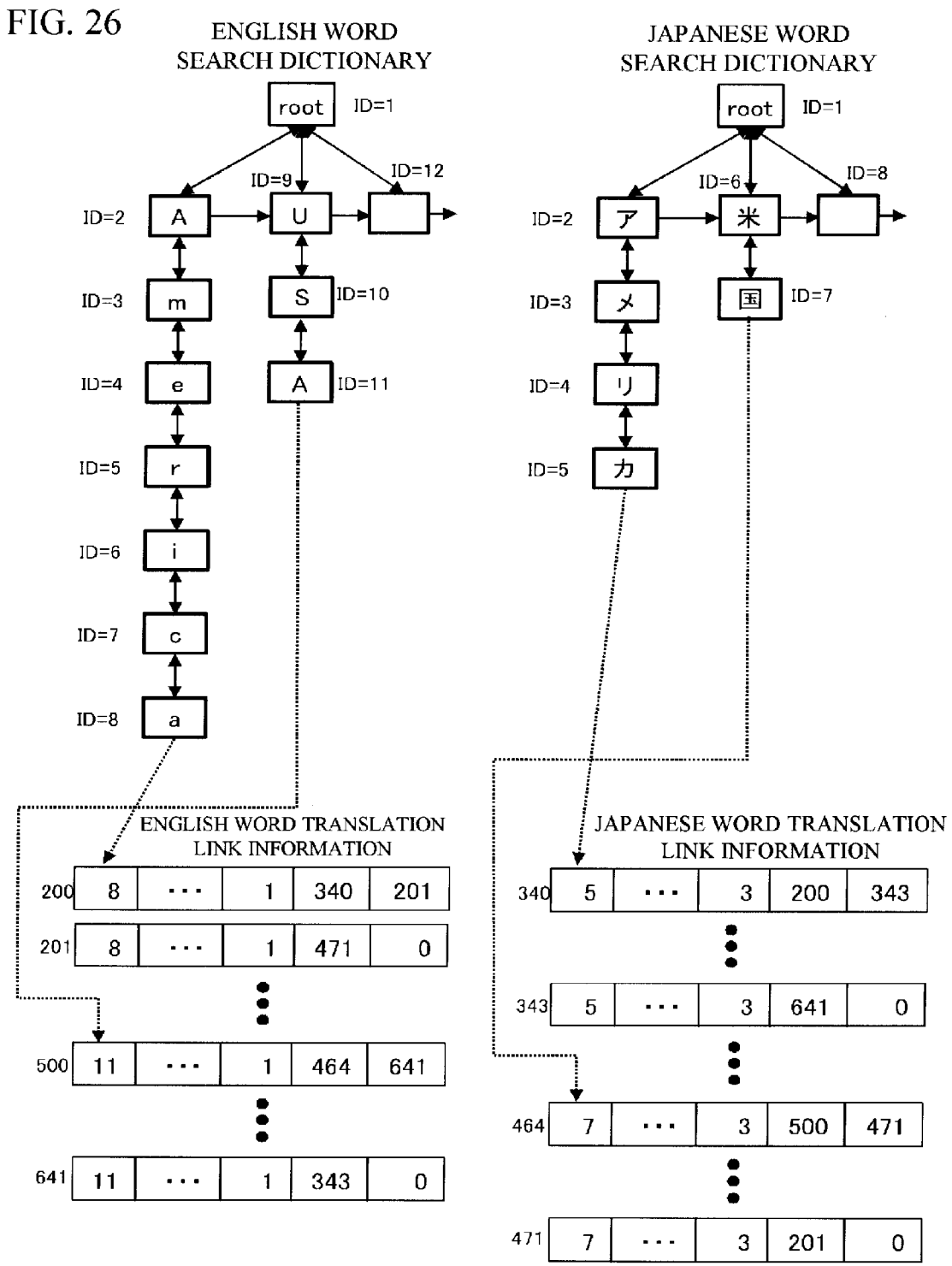
FIG. 26 illustrates the structure of a bilingual dictionary to be used in word translation between Japanese and English, where an array structure base is employed.

FIG. 26 illustrates the structure of a bilingual dictionary to be used in word translation between Japanese and English by the word direct translation engine 20 in a case where an array structure base is employed for the word translation link information. In a TRIE structure in the Japanese word search dictionary, the word "America" in Japanese and the word "USA" in Japanese as a synonym for the word "America" are stored. In a TRIE structure in the English word search dictionary, the word "America" and the word "USA" as a synonym for the word "America" are stored.

In this case, the Japanese word translation link information contains the word information record having a word information record ID "340" and the word information record having a word information record ID "343" corresponding to the word "America" in Japanese, and the word information record having a word information record ID "464" and the word information record having a word information record ID "471" corresponding to the word "USA" in Japanese.

The English word translation link information contains the word information record having a word information record ID "200" and the word information record having a word information record ID "201" corresponding to the word "America", and the word information record having a word information record ID "500" and the word information record having a word information record ID "641" corresponding to the word "USA". The word "America" in Japanese is synonymous with the word "USA" in Japanese, and the word "America" in English is also synonymous with the word "USA" in English.

The word information record having the ID "340" in the Japanese word translation link information contains the word ID "5" of the subject word "America" in Japanese, the language ID "3" of the English language as the translation language, the ID "200" of the word information record of the word "America" in English as the translation language, and the ID "343" of the word information record of the next synonymous word. The word information record having the ID "343" in the Japanese word translation link information contains the word ID "5" of the subject word "America" in Japanese, the language ID "3" of the English language as the translation language, the ID "641" of the word information record of the word "USA" as a synonym for the word "America" in English as the translation language or the word "USA" in English as the translation language that is a translation of the word "USA" in Japanese as a synonym for the word "America" in Japanese, and the next synonymous word information record ID "0" indicating that there is not a word information record of the next synonymous word.

Also, the word information record having the ID "464" in the Japanese word translation link information contains the word ID "7" of the subject word "USA" in Japanese, the language ID "3" of the English language as the translation language, the ID "500" of the word information record of the word "USA" in English as the translation language, and the ID "471" of the word information record of the next synonymous word. The word information record having the ID "471" in the Japanese word translation link information contains the word ID "7" of the subject word "USA" in Japanese, the language ID "3" of the English language as the translation language, the ID "201" of the word information record of the word "America" in English as a synonym for the word "USA" in English as the translation language or the word "America" in English as the translation language that is a translation of the word "America" in Japanese as a synonym for the word "USA" in Japanese, and the next synonymous word information record ID "0" indicating that there is not a word information record of the next synonymous word.

Meanwhile, the word information record having the ID "200" in the English word translation link information contains the word ID "8" of the subject word "America" in English, the language ID "1" of the Japanese language as the translation language, the ID "340" of the word information record of the word "America" in Japanese as the translation language, and the ID "201" of the word information record of the next synonymous word. The word information record having the ID "201" in the English word translation link information contains the word ID "8" of the subject word "America" in English, the language ID "1" of the Japanese language as the translation language, the ID "471" of the word information record of the word "USA" as a synonym for the word "America" in Japanese as the translation language or the word "USA" in Japanese as the translation language that is a translation of the word "USA" in English as a synonym for the word "America" in English, and the next synonymous word information record ID "0" indicating that there is not a word information record of the next synonymous word.

Also, the word information record having the ID "500" in the English word translation link information contains the word ID "11" of the subject word "USA" in English, the language ID "1" of the Japanese language as the translation language, the ID "464" of the word information record of the word "USA" in Japanese as the translation language, and the ID "641" of the word information record of the next synonymous word. The word information record having the ID "641" in the English word translation link information contains the word ID "11" of the subject word "USA" in English, the language ID "1" of the Japanese language as the translation language, the ID "343" of the word information record of the word "America" as a synonym for the word "USA" in Japanese as the translation language or the word "America" in Japanese as the translation language that is a translation of the word "America" in English as a synonym for the word "USA" in English, and the next synonymous word information record ID "0" indicating that there is not a word information record of the next synonymous word.

As described above, Japanese words and English words are linked with each other through the Japanese and English word translation link information. Where the word "America" in English is translated into Japanese, the word direct translation engine 20 detects the word information record having the ID "200" that contains the word ID "8" of the word "America" in English in the English word translation link information and the language ID "1" of the Japanese language. The word direct translation engine 20 then detects the word information record having the ID "201" that is the word information record of the next synonymous word contained in the word information record having the ID "200". Based on the word information record ID "340" corresponding to the Japanese word as a translation contained in the word information record having the ID "200", the word direct translation engine 20 detects the word information record having the ID "340" in the Japanese word translation link information. Also, based on the word information record ID "471" corresponding to the Japanese word as a translation contained in the word information record having the ID "201", the word direct translation engine 20 detects the word information record having the ID "471" in the Japanese word translation link information. Based on the word ID "5" contained in the word information record having the ID "340", the word direct translation engine 20 extracts the word "America" from the Japanese word search dictionary. Based on the word ID "7" contained in the word information record having the ID "471", the word direct translation engine 20 extracts the word "USA" from the Japanese wore search dictionary. Through this operation, the word "America" in English is translated into the words "America" and "USA" in Japanese.

Figure 27:
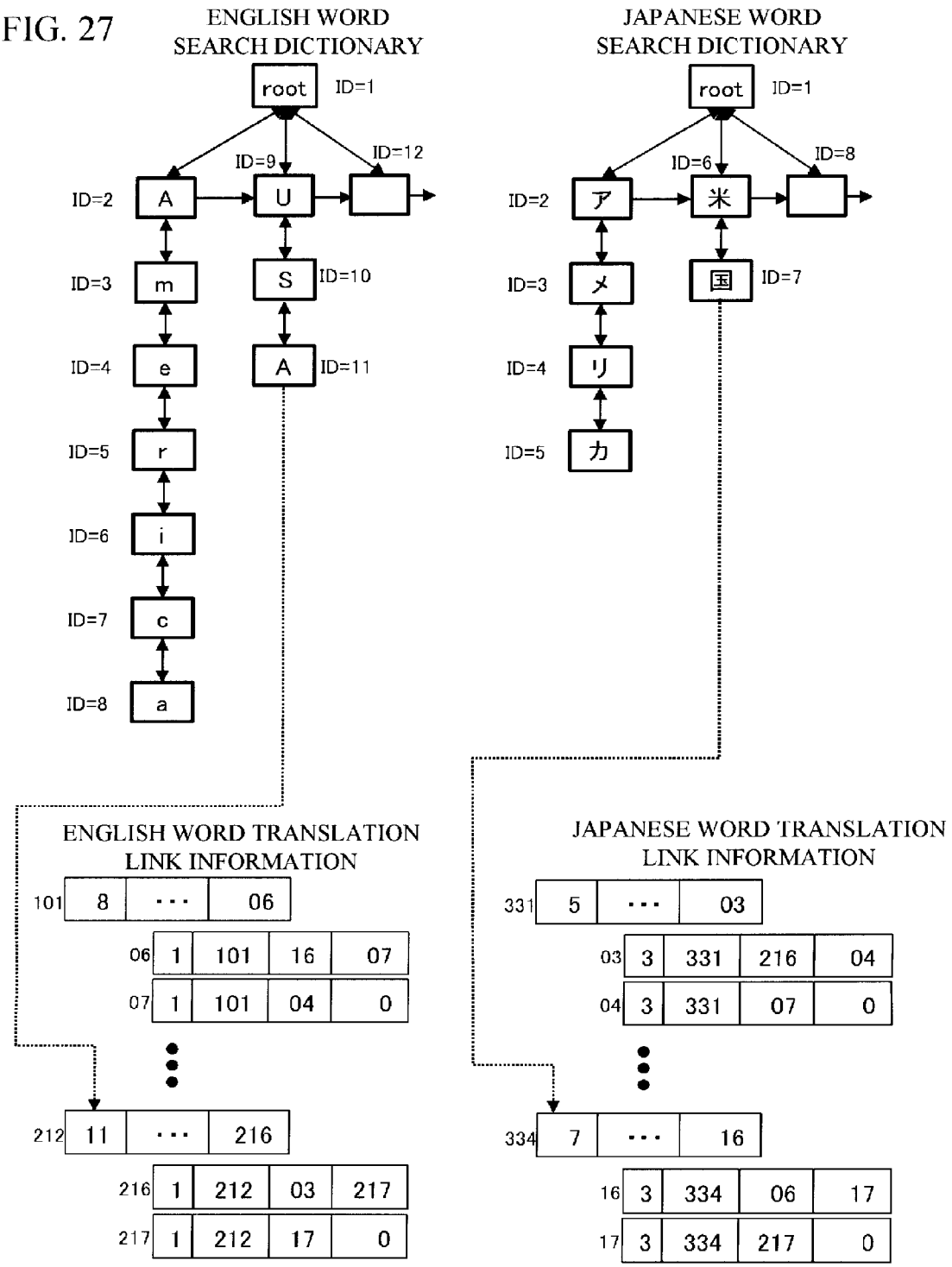
FIG. 27 illustrates the structure of a bilingual dictionary to be used in word translation between Japanese and English, where a double-array structure base is employed.

FIG. 27 illustrates the structure of a bilingual dictionary to be used in word translation between Japanese and English by the word direct translation engine 20 in a case where a double-array structure base is employed for the word translation link information. The TRIE structures in the Japanese and English word search dictionaries are the same as the structure shown in FIG. 23, and therefore, explanation of them is omitted herein.

The Japanese word translation link information contains the word information record having the word information record ID "331" corresponding to the word "America", and the word information record having the word information record ID "334" corresponding to the word "USA". The Japanese word translation link information further contains the synonymous word information records that have the IDs "03" and "04", and have the word information record of the ID "331" as a parent record, and the synonymous word information records that have the IDs "16" and "17", and have the word information record of the ID "334" as a parent record.

The English word translation link information contains the word information record having the word information record ID "101" corresponding to the word "America", and the word information record having the word information record ID "212" corresponding to the word "USA". The English word translation link information further contains the synonymous word information records that have the IDs "06" and "07", and have the word information record of the ID "101" as a parent record, and the synonymous word information records that have the IDs "216" and "217", and have the word information record of the ID "212" as a parent record.

The word information record having the ID "331" in the Japanese word translation link information contains the word ID "5" of the subject word "America" in Japanese, and the ID "03" of the synonymous word information record as a child record. The synonymous word information record having the ID "03" contains the language ID "3" of the English language as the translation language, the ID "331" of the word information record as the parent record, the ID "216" of the synonymous word information record as a child record of the word information record corresponding to the word "USA" in English as a synonym for the subject word in English as the translation language, and the ID "04" of the synonymous word information record of the next synonymous word. The synonymous word information record having the ID "04" contains the language ID "3" of the English language as the translation language, the ID "331" of the word information record as the parent record, the ID "07" of the synonymous word information record as a child record of the word information record corresponding to the word "America" in English as the translation language, and the next synonymous word information record ID "0" indicating that there is not a synonymous word information record of the next synonymous word.

The word information record having the ID "334" in the Japanese word translation link information contains the word ID "7" of the subject word "USA" in Japanese, and the ID "16" of the synonymous word information record as a child record. The synonymous word information record having the ID "16" contains the language ID "3" of the English language as the translation language, the ID "334" of the word information record as the parent record, the ID "06" of the synonymous word information record as a child record of the word information record corresponding to the word "America" in English as a synonym for the subject word in English as the translation language, and the ID "17" of the synonymous word information record of the next synonymous word. The synonymous word information record having the ID "17" contains the language ID "3" of the English language as the translation language, the ID "334" of the word information record as the parent record, the ID "217" of the synonymous word information record as a child record of the word information record corresponding to the word "USA" in English as the translation language, and the next synonymous word information record ID "0" indicating that there is not a synonymous word information record of the next synonymous word.

Meanwhile, the word information record having the ID "101" in the English word translation link information contains the word ID "8" of the subject word "America" in English, and the ID "06" of the synonymous word information record as a child record. The synonymous word information record having the ID "06" contains the language ID "1" of the Japanese language as the translation language, the ID "101" of the parent word information record, the ID "16" of the synonymous word information record as a child record of the word information record corresponding to the word "USA" in Japanese as a synonym for the subject word in Japanese as the translation language, and the ID "07" of the synonymous word information record of the next synonymous word. The synonymous word information record having the ID "07" contains the language ID "1" of the Japanese language as the translation language, the ID "101" of the parent word information record, the ID "04" of the synonymous word information record as a child record of the word information record corresponding to the word "America" in Japanese as the translation language, and the next synonymous word information record ID "0" indicating that there is not a synonymous word information record of the next synonymous word.

The word information record having the ID "212" in the English word translation link information contains the word ID "11" of the subject word "USA" in English, and the ID "216" of the synonymous word information record as the child record. The synonymous word information record having the ID "216" contains the language ID "1" of the Japanese language as the translation language, the ID "212" of the parent word information record, the ID "03" of the synonymous word information record as a child record of the word information record corresponding to the word "America" in Japanese as a synonym for the subject word in Japanese as the translation language, and the ID "217" of the synonymous word information record of the next synonymous word. The synonymous word information record having the ID "217" contains the language ID "1" of the Japanese language as the translation language, the ID "212" of the parent word information record, the ID "17" of the synonymous word information record as a child record of the word information record corresponding to the word "USA" in Japanese as the translation language, and the next synonymous word information record ID "0" indicating that there is not a synonymous word information record of the next synonymous word.

As described above, Japanese words and English words are linked with each other through the Japanese and English word translation link information. Where the word "America" in English is translated into Japanese, the word direct translation engine 20 detects the word information record having the ID "101" that contains the word ID "7" of the word "America" in English in the English word translation link information. Based on the synonymous word information record ID "06" contained in the word information record having the ID "101", the word direct translation engine 20 detects the synonymous word information record having the ID "06". Based on the synonymous word information record ID "07" corresponding to the next synonymous word contained in the synonymous word information record having the ID "06", the word direct translation engine 20 detects the synonymous word information record having the ID "07". Based on the synonymous word information record IDs "04" and "16" as the child records of the word information record corresponding to the Japanese words as translations contained in the detected synonymous word information records having the IDs "06" and "07", the word direct translation engine 20 detects the synonymous word information records having the IDs "04" and "16" as the child records of the word information records corresponding to the Japanese words. Based on the parent word information record IDs "331" and "334" contained in the detected synonymous word information records having the ID "04" and the ID "06", the word direct translation engine 20 detects the word information records having the ID "331" and the ID "334". Based on the word ID "5" contained in the word information record having the ID "331", the word direct translation engine 20 extracts the word "America" from the Japanese word search dictionary. Based on the word ID "7" contained in the word information record having the ID "334", the word direct translation engine 20 extracts the word "USA" from the Japanese wore search dictionary. Through this operation, the word "America" in English is translated into the words "America" and "USA" in Japanese.

The word direct translation engine 20 outputs the word obtained through the above-described translation procedures to the object language text sentence creating unit 22. If there are two or more translations, the word direct translation engine 20 compares the part of speech attribute of the subject word of the source language with the part of speech attribute of each translation, and may output only the translation having the same part of speech attribute as the subject word of the source language among the translations. If there are two or more translations having the same part of speech attribute as the subject word of the source language, the word direct translation engine 20 may arbitrarily select and output one of the translations. If there is not a word as a translation result, the word direct translation engine 20 outputs the subject word of the source language to the object language text sentence creating unit 22. Based on each input word and each translation, the word direct translation engine 20 can obtain various kinds of information such as statistical information and grammatical information from an external knowledge database (not shown).

As described above, words of one language are linked with words of another language through the word translation link information. Thus, translations can be made between two languages or among three or more languages.

Although a few preferred exemplary embodiments of the present invention have been shown and described, the present invention is not limited to those embodiments, and changes may be made in these embodiments without departing from the principles and spirit of the invention, the scope of which is defined in the claims.

INDUSTRIAL APPLICABILITY

The word translation device in accordance with the present invention may be used to complement a translation memory engine, a pattern-based translation engine, a chunk-based example translation engine, and an analysis-based translation engine (see FIG. 1), or may be used in combination with a translation engine, a pattern-based translation engine, or a chunk-based example translation engine. The word translation device may be formed as an independent structure. The word translation device may be embodied by mounting the software for executing the functions of the word translation device on a computer, or may be used as a portable electronic dictionary.

The invention claimed is:

1. A machine translation system comprising: a translating unit that inputs a sentence and translates the sentence; and a word translation device that performs word translation among a plurality of languages, which word translation device inputs a word included in the sentence that is not translated by the translating unit and translates the word, the word translation device comprising:
    a storage unit that stores at least a first word search structure, a second word search structure, a first word and translation information record, and a second word and translation information record in a dictionary, the first word search structure being provided for searching for a word of a first language, the second word search structure being provided for searching for a word of a second language, the first word and translation information record including word-associated information and translation information as to words stored in the first word search structure, and the second word and translation information record including word-associated information and translation information as to words stored in the second word search structure;
    an input unit that inputs a word;
    a referring unit that refers the input word to the words stored in the first word search structure, wherein the first and second word search structures include first and second links, respectively, for identifying the first and second word and translation information records;
    an extracting unit that extracts a translation from the translations stored in the second word search structure, based on the first word and translation information record associated with the words, the first word and translation information record retrieved by the extracting unit based on the first link; and
    an output unit that outputs the extracted translation,
    wherein the translation information of the first word and translation information record includes a link for identifying a translation stored in the second word search structure or the second word and translation information record,
    wherein the extracting unit extracts the translation stored in the second word search structure or the second word and translation information record, based on the link included in the first word and translation information record associated with the words referred to by the referring unit,
    wherein the first and second word and translation information records include records that store one piece of word-associated information and one piece of translation information as to each part of speech for words included in the first and second word search structures, when the words have a plurality of parts of speech,
    wherein the record of each part of speech is associated with the one piece of word-associated information by a pointer.

2. The word translation device machine translation system according to claim 1, wherein the first and second word and translation information records include word identification information for identifying the words stored in the first and second word search structures, respectively.

3. The word translation device machine translation system according to claim 1, wherein the first and second word and translation information records include attribute information associated with the words stored in the first and second word search structures, respectively.

4. The word translation device machine translation system according to claim 1, wherein:
    the first word and translation information record includes translation identification information for identifying the translation information stored in the second word and translation information record; and
    the second word and translation information record includes translation identification information for identifying the translation information stored in the first word and translation information record.

5. The word translation device machine translation system according to claim 1, wherein the first and second word and translation information records include identification information for identifying synonyms for each translation.

6. The word translation device machine translation system according to claim 1, wherein the first and second word and translation information records include identification information for identifying the kind of a language in which a translation is made.

7. The machine translation system according to claim 1, wherein the translating unit includes at least one of a translation memory engine, a pattern-based translation engine, and a chunk-based example translation engine.

8. The machine translation system according to claim 7, further comprising
    a distinction output unit that distinguishes a translation of the word that is not translated by the translating unit from other translations, and outputs the translation.

9. A word translation method for translating words among a plurality of languages, comprising:
    storing, using a processor, a first word search structure, a second word search structure, a first word information record, and a second word information record in a dictionary, the dictionary stored on a memory, the first word search structure being provided for searching for a word of a first language, the second word search structure being provided for searching for a word of a second language, the first word information record including first translation information for identifying translations of words stored in the first word search structure, the second word information record including second translation information for identifying translations of words stored in the second word search structure;
    inputting a word;
    referring the input word to the words stored in the first word search structure, wherein the first and second word search structures include first and second links, respectively, for identifying the first and second word information records;

extracting a translation from the second word search structure, based on the first word information record of the referred word, the extracting comprising retrieving the first word information record based on the first link; and outputting the extracted translation, wherein the translation information of the first word information record includes a link for identifying a translation stored in the second word search structure or the second word information record, wherein the extracting comprises extracting the translation stored in the second word search structure or the second word information record, based on the link included in the first word information record associated with the words referred to by the referring unit, wherein the first and second word information records include records that store one piece of word-associated information and one piece of translation information as to each part of speech for words included in the first and second word search structures, when the words have a plurality of parts of speech, wherein the record of each part of speech is associated with the one piece of word-associated information by a pointer.

10. A non-transitory computer readable medium storing a program causing a computer to execute a process for word translation, the process comprising:

storing, using a processor, a first word search structure, a second word search structure, a first word information record, and a second word information record in a dictionary, the dictionary stored on a memory, the first word search structure being provided for searching for a word of a first language, the second word search structure being provided for searching for a word of a second language, the first word information record including first translation information for identifying translations of words stored in the first word search structure, the second word information record including second translation information for identifying translations of words stored in the second word search structure;

inputting a word;

referring the input word to the words stored in the first word search structure, wherein the first and second word search structures include first and second links, respectively, for identifying the first and second word information records;

extracting a translation from the second word search structure, based on the first word information record of the referred word, the extracting comprising retrieving the first word information record based on the first link; and outputting the extracted translation, wherein the translation information of the first word information record includes a link for identifying a translation stored in the second word search structure or the second word information record, wherein the extracting comprises extracting the translation stored in the second word search structure or the second word information record, based on the link included in the first word information record associated with the words referred to by the referring unit, wherein the first and second word information records include records that store one piece of word-associated information and one piece of translation information as to each part of speech for words included in the first and second word search structures, when the words have a plurality of parts of speech, wherein the record of each part of speech is associated with the one piece of word-associated information by a pointer.

* * * * *